US006675437B1

United States Patent
York

(10) Patent No.: US 6,675,437 B1
(45) Date of Patent: Jan. 13, 2004

(54) PORTABLE HIGH-TEMPERATURE, HIGH-PRESSURE WASHING PLANT

(76) Inventor: Shawn L. York, 10942 Cindy Cir., Sandy, UT (US) 84092

( * ) Notice: Subject to any disclaimer, the term of this patent is extended or adjusted under 35 U.S.C. 154(b) by 0 days.

(21) Appl. No.: 09/868,350

(22) PCT Filed: Dec. 15, 2000

(86) PCT No.: PCT/US99/29770
§ 371 (c)(1),
(2), (4) Date: Jun. 15, 2001

(87) PCT Pub. No.: WO00/35329
PCT Pub. Date: Jun. 22, 2000

(51) Int. Cl.[7] .................................................. A47L 5/36
(52) U.S. Cl. ............................ 15/321; 15/320; 15/340.1
(58) Field of Search .................... 15/320, 321, 540.1; 122/3; 165/51; 239/129, 130

(56) References Cited

U.S. PATENT DOCUMENTS

| | | | |
|---|---|---|---|
| 2,894,265 A | 7/1959 | Reardon | |
| 3,698,992 A | 10/1972 | Armand | |
| 3,964,458 A | 6/1976 | Strauss et al. | |
| 4,109,340 A | 8/1978 | Bates | |
| 4,154,578 A | 5/1979 | Bane | |
| 4,158,248 A | * 6/1979 | Palmer | 15/321 |
| 4,284,127 A | 8/1981 | Collier et al. | |
| 4,336,627 A | * 6/1982 | Bascus | 15/321 |
| 4,443,909 A | 4/1984 | Cameron | |
| 4,593,753 A | * 6/1986 | McConnell | 165/51 |
| 4,862,551 A | 9/1989 | Martinez et al. | |
| 4,862,951 A | 9/1989 | Muller et al. | |
| 4,940,082 A | 7/1990 | Roden | |
| 4,949,424 A | 8/1990 | Shero | |
| 4,991,254 A | 2/1991 | Roden et al. | |
| 5,165,139 A | 11/1992 | Oxman | |
| 5,299,585 A | 4/1994 | Dall'Oglio | |
| 5,469,598 A | 11/1995 | Sales | |
| 5,979,012 A | * 11/1999 | Fritz | 15/321 |

\* cited by examiner

Primary Examiner—Theresa T. Snider
(74) Attorney, Agent, or Firm—Kirton & McConkie; Berne S. Broadbent

(57) ABSTRACT

A washing system for high temperature cleaning applications, such as carpet-cleaning, is disclosed that provides a consistent cleaning fluid temperature. The washing system utilizes multiple heat exchangers and multiple heat paths. The heating and power source is provided by a medium duty, diesel cycle engine. Multi-stage heating involves heat transfer from the engine's coolant to the cleaning fluid and heat transfer from the exhaust of the engine to the cleaning fluid via an intermediate medium. The system also includes a fluid clutch used to engage a power takeoff from the engine to operate the pump and blower of the washing plant. A failsafe source cutoff diverts the exhaust flow from thermal contact with an intermediate heat transfer oil.

117 Claims, 12 Drawing Sheets

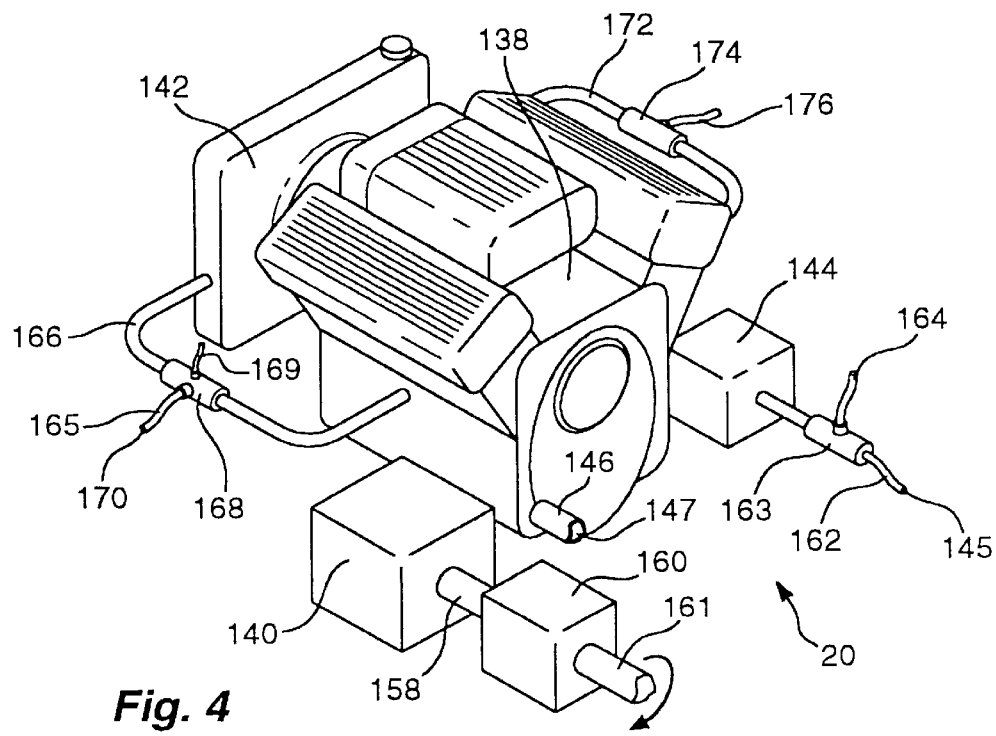

PORTABLE HIGH-TEMPERATURE, HIGH-PRESSURE WASHING PLANT

BACKGROUND

1. Related Application

The present application is related to and claims priority to PCT Application Serial No. PCT US99/29770, International Filing Date of Dec. 15, 1999, and Priority Date of Dec. 17, 1998, which is incorporated herein by reference for all purposes.

2. The Field of the Invention

This invention relates to carpet cleaning generally, and more particularly to portable, self-contained pumping and heating systems for carpet cleaning. More particularly still, the invention relates to a cleaning system that uses heated cleaning solution where the heat is derived from secondary heat of a primary heat-generating engine, which also provides mechanical force used to deliver and remove the cleaning solution during cleaning.

3. The Background Art

Ever since carpets came into common use, people have wrestled with the difficulty of keeping them clean. Carpet, unlike other fabric in household use, is exposed to an enormous amount of foreign matter such as dirt, grass, leaves, sand, dust, mud, animal hair, and spilled food. The problem is compounded by both the permanent (e.g. wall-to-wall) installation of carpet and the length of fibers found in many carpets. Permanent (e.g. wall-to-wall) installation requires on-site cleaning. Bundles or yarns comprised of many fibers tend to capture or adhere to soiling, such as particulate matter. Conventional washing and cleaning processes remain ineffective.

"Hot-water extraction" methods have been developed to facilitate carpet-cleaning. Hot water may actually include liquid water; saturated, two-phase, steam and water droplets; or superheated steam. The latter is not commonly relied upon, since it is typically hotter than the distortion temperature of synthetic fibers. Moreover, the energy requirements for the phase change to steam simply cannot be met by most heating plants for the purpose.

According to these methods, water is heated, pressurized, supplemented with chemical cleaning additives and applied to carpet in order to dissolve or release soils and particulates and to suspend the resulting matter in the water (e.g. solvent, carrier, etc.). A "vacuum" system then extracts the dissolved soils, suspended particulates, and water out of the fibers. The water and air flows drawn by the vacuum system entrain the entire mixture, carrying it to a holding tank.

Because the majority of soiling in textiles is oil and acid based, textile cleaning machine operators rely on basic solutions for cleaning agents. Also, because temperature greatly affects the processes of dissolving and chemical reactions, the higher the temperature of a cleaning fluid, the more effective the cleaning process. The water should preferably be at about 210° F. at the carpet surface. When water is substantially cooler, machine operators compensate by increasing the pressure, chemical content, or quantity of the cleaning fluid, or some combination thereof.

Pressure translates to fluid velocity, which affects penetration of fiber bundles (yarns) by the fluid. Higher velocity fluid may also better strip soils from fibers mechanically. Mechanical agitation may improve rates of dissolving by a solvent, and may reduce boundary layers near fibers for improved chemical reaction.

Water-based carpet cleaning may apply or leave excess water standing in carpets, or retained by surface tension therein. Excess water tends to damage carpets by soaking into areas over time, causing over-wetting. Over-wetted textiles often show signs of reduced strength, mildew, and delamination, a process in which the carpet takes on a rippled appearance due to separation of primary and secondary backings.

Excessive concentrations of chemicals (typically alkaline) may increase reaction rates for dissolving or removing soils, by removing binding agents adhering them to carpets. However, increasing chemical concentrations creates a whole new series of problems. Alkaline chemicals may remove or discolor pigments in carpet, remove stain-resisting treatments, void manufacturers' warranties, and attack fibers, glues, or backing materials' structural integrity. Also, cleaning chemicals are known to leave residues that cause carpet to re-soil at an accelerated rate by adhering to soiling materials.

Increased cleaning fluid temperatures increase chemical reaction rates, allowing textile cleaners to decrease the concentration of chemicals, the fluid pressure, and the fluid quantity used in the cleaning process. If the temperature of the cleaning fluid is high enough, soils can be removed even without chemical additives, high fluid pressure, or large quantities of fluid. The result is still somewhat chemical in nature, since water is a "solvent" for many naturally occurring materials. Also, temperature can affect diffusion of water into a material to be dissolved, and diffusion of dissolved materials in a structure, just as with other chemical processes.

Increasing the cleaning fluid temperature may change the thermodynamics of the application and drying process. For example, if less time is required to apply a high-speed spray of droplets, less soaking can occur. Also, the thermodynamic quality of the water in a high pressure jet may be increased, providing increased steam to break up water into smaller droplets, and to augment the air flow moving away form the cleaned carpet yarns. Less water residence time, and smaller particle sizes for water droplets result in entrainment of more liquid in the vacuum drawn pickup line. Likewise, higher energy content, less water, and less residence time means faster drying time. Thus, the risk of de-lamination, mold growth, tensile strength loss, and other ill effects of moisture is reduced. Instead, carpet is left with low moisture and a more neutral pH.

For effective cleaning, cleaning fluid temperatures must not only be high, but consistent. Since the effectiveness of any hot-water extraction method depends greatly on the fluid temperature, an inconsistent fluid temperature results in a carpet that appears patchy because it is cleaner in some places than in others. In addition, temperatures in excess of 240° F. can permanently yield synthetic fibers, thereby causing fiber memory loss and ruining the pile texture of carpet.

Several different types of hot-water extraction systems have been developed in the carpet cleaning industry. "Portable" systems are moved into a building and transported from room to room by an operator. They typically use household electricity and water supplies to run motors and heaters needed to heat, apply, and remove water. As a result, they provide inferior cleaning temperatures, typically in the range of 80° to 120° F. at the carpet surface. Portable machines are notorious for excessive use of chemicals. High chemical concentrations are required to clean textiles because of comparatively low cleaning temperatures.

"Truck-mounted" textile cleaning equipment may be of an "integral" type, also known as "direct drive" type (dependent on the automotive power plant for energy), or of a "slide-in" type (standalone). Each has its own set of performance and maintenance problems.

Direct drive systems marketed today rely exclusively on heat extracted from the engine coolant (radiator water). The result is that the best heat exchangers and transfer times do not produce a maximum cleaning fluid temperature above 195° F. in the heat exchanger, which temperature is substantially reduced by the time fluid reaches a carpet surface.

Integrated, direct drive systems rely on the coolant of an internal combustion engine to provide heat to the cleaning fluid. They rely on the fan belts of the vehicle engine for mechanical power. Such systems can provide comparatively high vacuum power, but temperatures typically range from 100° to 170° F. at the carpet surface. Since they take energy from the coolant that passes through the vehicle radiator, they provide an inconsistent, and still too low fluid temperature at the carpet surface. A lot of energy is available from the engine coolant, but at a low thermodynamic availability.

The fan belt from a typical utility van drives a shaft running from the vehicle engine, between the vehicle seats, to the bed of the van to power the pump and vacuum equipment. Unfortunately, large, high torque (e.g. V-8), gasoline-powered engines, were not designed to run stationary at 1500 RPM for hours at a time just to drive the fan belt while carpet cleaners perform their work. Without a consistent convective air flow, gasoline engines idling for lengthy periods of time tend to create enormous amounts of radiant heat that which destroys electrical components and leads to reliability problems.

Although sometimes a significant improvement over portable systems, and slide-in units, the integrated, truck-mounted systems can also dump substantial waste heat and vibrational energy into the vehicle. They tend to destroy the vehicle body, wear out the engine, and damage its electrical equipment and mechanical connections. These problems have been exacerbated during recent years by the introduction of electronic components and controls about the cab and engine bay of modem vehicles. Electrical and electronic components degrade near heat sources. The result is a continuing degradation and failure of electrical and electronic components. Such failures regularly render the engine inoperative until the failed component is replaced.

"Slide-in" machines typically depend on a small gasoline engine to power equipment, all installed in a common utility vehicle such as a van. Process heat is taken from the heat rejected by the engine. As with direct-drive systems, the equipment compartment (bed) and cab of a van become very hot when the engine is run in stationary mode with only the confined, standard, inadequate cooling system. The unit is also nearly impossible to isolate mechanically from the body of the vehicle. As a practical matter, slide-in systems literally self-destruct during a comparatively short and very unreliable life.

Thus, these self-contained, slide-in systems are generally regarded as even more problematic and unreliable than direct drive systems. Poor reliability and durability should come as no surprise because of the extraordinary amounts of heat rejected by the engines into the environment. Moreover, the net thermal energy output is still typically too low to support the amount of water flow required for a high rate of cleaning.

Stationary (e.g. slide-in) engines are not designed and operated at the efficiencies common to current automotive power plants. When the engines of slide-in units have been selected to have thermal outputs to support higher temperatures at the required water flow rates, the fuel efficiency is still extremely poor, and the environmental heat rejection problem is even more serious.

The exhaust temperature for a gasoline internal combustion engine may be as high as 1400° F. The temperature difference above that of the cleaning fluid, and thus the thermodynamic availability, is initially adequate. However, for a small engine (e.g. slide-in unit), the mass flow rate of exhaust is very low, so overall heat transferred to the cleaning fluid is also low.

Auxiliary heating is a method tried for improving performance of direct-drive systems. Despite their increased mechanical power, currently available direct drive machines remain incapable of maintaining a consistently high cleaning fluid temperature. Use of external heating devices may raise the top-end temperature. However, use of auxiliary burners, such as propane, kerosene, diesel, and electric burners, has been declining in recent years.

External heating is cumbersome, inconvenient to set-up, expensive, and possibly even dangerous due to the possibility of fire or overheating. However, some carpet-cleaning professionals persist in using external heating machines because the co-generating devices (capturing waste heat from a thermodynamic engine to use as process heat) typically cannot produce a sufficiently high temperature (over 170° F. at the carpet, over 195° F. in the system), sufficient efficiency, nor an acceptable level of reliability.

Several other details related to the foregoing comparisons are noteworthy. For example, the fuel consumption characteristics of car and truck engines have been regulated by the Environmental Protection Agency since 1971. As a result, manufacturers have developed the cycle timing, fuel-to-air ratios, and cylinder dimensions of vehicle engines to greatly decrease the amount of fuel required to provide a given power output. However, stationary engines for comparatively unregulated, limited use, such as those found in slide-in systems, have not been optimized to the same extent. As a result, larger slide-in motors consume a great deal of fuel without providing a comparable amount of power or rejected heat required for process heating.

Technically, both slide-in units and direct-drive systems are co-generation plants, since a single engine provides process heat and mechanical output. Nevertheless, perhaps the most serious problem for co-generation systems is the failure of their control systems. Valves, whether driven by solenoids or vacuum, quickly foul with calcium, lime, magnesium, and other precipitates. Meanwhile, the high environmental temperatures inherent in such systems destroy the electrical and electronic control components.

Vehicle engines on direct-drive machines produce comparatively more rejected heat to the radiator, at low availability, while exhausting the combustion gases to ambient. Direct drive, co-generation machines lack any safe, reliable, and convenient method for conveying the cleaning fluid and the exhaust through a heat exchanger. Bringing an engine exhaust line into an enclosed rear cabin of a vehicle, together with the pumping equipment and cleaning fluid, is dangerous. An inevitable opening or leak in the exhaust pipe would fill the vehicle with exhaust gases, which are toxic, corrosive, and possible even highly combustible.

Likewise, extending a cleaning fluid line outside the cabin of a van or other service vehicle to access and exhaust line is not a viable solution. Any water-based cleaning fluid left in the line in cold weather will freeze when the engine is not running, bursting the line.

Exhaust gases from an internal combustion engine vary significantly in temperature due to changes in the combustion rate and temperature of the engine. In addition, the amount of heat transferred by exhaust must be distributed over some amount of cleaning fluid. Cleaning fluid moving comparatively slowly through a heat exchanger during a time of less use of such fluid by an operator, will absorb more heat and exit the exchanger at a comparatively higher temperature. If an operator stops to move furniture, reposition equipment, or make a dry pass to vacuum up excess cleaning fluid, the flow rate of cleaning fluid through a washing plant will slow or stop. The resulting temperatures and pressures can harm carpet, destroy equipment, and cause personal injury.

Perhaps most importantly, all co-generation systems that rely on exhaust gases for top-end heat must jettison heated cleaning fluid in order to control temperatures and heat flow balances. Solutions expelling overheated cleaning fluid either out of the system or into a waste tank when it becomes too hot are inadequate. One drawback of such a safety device is that the cleaning fluid must be replenished before cleaning can resume. Also, jettisoned cleaning fluid wastes both heat and fluid. Anything vented to the holding tank reduces capacity, and must be dumped along with the collected soiled cleaning fluid. Thus, dump valve systems are inconvenient and potentially harmful to the environment. Every day, thousands of gallons of cleaning fluid are wasted in the carpet cleaning industry due to cleaning fluid venting performed in the name of temperature regulation.

Devices that shut down the system are similarly inconvenient, and often not safe. A failure in a temperature regulating mechanism can allow the fluid temperature to continue rising to dangerous levels. Meanwhile, the electrical and electronic control elements, such as sensors, solenoids, and valves, used to detect excessive temperatures and bleed off cleaning fluid or shut down the system are prone to failure. Control orifices can be very small and are subject to clogging from calcium, lime, and magnesium deposits from the cleaning fluid. The high temperatures involved accelerate the buildup of deposits and can damage the wire coils and insulation, causing failure in items such as solenoids. Valve failures can cause catastrophic failure of the entire system.

One more problem that plagues known washing plants involves the method by which mechanical power is transferred from the vehicle engine to the pumps and heaters. Current direct drive systems are driven by a shaft coupled to a fan belt of the engine. No carpet cleaning system is known to use any power takeoff coming directly from the engine or from a transmission or transfer case. Transmissions are delicate and expensive. Just as engines are overworked, and improperly worked in such an application, gear systems would be overworked and be subject to mechanical failures due to repeated engagement and disengagement of the PTO gears if operated to control connection of mechanical systems to engine power.

A great need exists for a direct drive washing plant capable of capturing heat from both the radiator coolant and engine exhaust gases. Such a washing plant should provide high cleaning fluid temperatures necessary for effective particulate release, solution, or suspension as required. The system needs to be freezing-safe in virtually all weather, yet not damage vehicle structure or electronics. Operator safety is also needed, against exposure to exhaust gases, or pressure failures. A need also exists for a failsafe temperature regulation mechanism. The mechanism should permit heat exchange only when the entire system is active and functional, thereby preventing overheating in the event of a failure of any element in the heat transfer system or thermal and flow regulation mechanisms. A reliable PTO drive train is needed for transferring mechanical energy, but more importantly for engaging and disengaging frequently and reliably for many duty cycles.

SUMMARY OF THE INVENTION

According to the present invention, a transportable cleaning system is disclosed that utilizes a direct drive washing plant with an intermediate, nonfreezing fluid to transfer heat between engine exhaust and a cleaning fluid. A failsafe thermostat device regulates the temperature of the cleaning fluid without interrupting the cleaning process or wasting cleaning fluid.

A PTO for mechanical power can run full time at the engine or transfer case without gear engagement and disengagement. Instead, a PTO clutch is engageable downstream from the transmission or transfer case in the power train. Thus high, positive displacement, mechanical power can be output reliably from the transmission or transfer case, not jury-rigged from the fan belt. The downstream positioning of the clutch permits the PTO to be continuously engaged, thereby avoiding the shifting frequency problems that might otherwise be encountered. Also, any constantly rotating PTO shaft provided in a production truck can be accessed and used.

In certain embodiments, an apparatus and method in accordance with the present invention may include a diesel vehicle engine to power pumps and blowers pressurizing cleaning fluid and air supplies. A hydraulically or otherwise actuated clutch may provide access to a full-time PTO shaft. Multiple heat exchangers, and multiple loop heat exchangers, retrieving heat from both exhaust flows and engine coolant, provide comparatively higher temperatures for heating cleaning fluids, such as water-based fluids. The higher, cleaning-fluid temperatures can be obtained through higher thermodynamic availability, more net energy available, higher heating fluid temperatures, improved heat exchange staging, and improved heat transfer efficiencies. The apparatus and method of the present invention provide delivery of necessary quantities of heated water, or even-superheated (pressurized and heated over ambient boiling point) water, in sufficient quantities to support a carpet cleaning tool (e.g. wand), at temperatures greater than 195° F. in the line and 170° F. at the carpet. Temperature may approach the ambient boiling point, which may even be exceeded by design, if desired, in the pressurized cleaning fluid.

Increased cleaning fluid temperatures enable faster and more thorough cleaning of carpets and other surfaces. In addition, carpet dries faster when cleaned with superheated steam or water. The enhanced vacuum power of the current invention allows multiple operators with separate lines and wands to work from a single supply system on one truck. This decreases cleaning time, cuts labor costs, and minimizes inconvenience to customers. Substantially lower repair costs and downtime flow from a simpler design. In addition, the current invention provides a 'multi-function" (e.g. steam cleaning and pressure washing) machine in accordance with new and newly proposed restrictions on hazardous waste dumping, promulgated by the EPA and other governmental agencies.

The integration of the cleaning system with the transport vehicle also possess a number of significant advantages over known washing plants. Legal seating is available for three instead of just two operators. Fuel consumption is lower per pound of heated cleaning fluid delivered. Adequate power is available to provide comparatively high mass flow rates of water for pressure washing at 2,000 psi.

Furthermore, more space and a higher weight capacity are available to support larger wastewater recovery tanks, thereby reducing the likelihood that hazardous materials will be dumped on streets or in storm drains accidentally or in relief valve operation. Less equipment set-up time is required because the vehicle has adequate space for cleaning fluid, tools, and other accessories. Since the vehicle carries its water on board, operators are free of the need to locate and connect to a water source (often an inadequate source) near each job site. The apparatus and method of the present invention are the only known means of eliminating the need to jettison needed water as a means of temperature control in co-generator heating systems. Since cleaning water is never jettisoned as a means for temperature control, the supply lasts longer and the waste tank does not fill up as fast. Since the exhaust flow is diverted to control overheating, the top-end cleaning fluid temperature is regulated without resorting to any manipulation of the heated water or heat exchanger performance.

BRIEF DESCRIPTION OF THE DRAWINGS

The foregoing and other features of the present invention will become more fully apparent from the following description and the invention as broadly as may eventually be claimed, taken in conjunction with the accompanying drawings. Understanding that these drawings depict only typical embodiments of the invention and are, therefore, not to be considered limiting of its scope, the invention will be described with additional specificity and detail through use of the accompanying text, in which:

FIG. 4 is a perspective view of one embodiment of an engine system suitable for the truck and apparatus of FIG. 1;

FIG. 5 is a perspective view of one embodiment of a fluid drive system suitable for the apparatus of FIG. 1;

DETAILED DESCRIPTION OF THE SPECIFIC EMBODIMENTS

It will be readily understood that the components of the present invention, as generally described and illustrated in the figures herein, could be arranged and designed in a wide variety of different configurations. Thus, the following more detailed description of the embodiments of the system and method of the present invention as represented in the figures, is not intended to limit the scope of the invention. The scope of the invention is as broad as claimed herein. The illustrations are merely representative of certain, presently described embodiments of the invention. Those presently described embodiments of the invention will be best understood by reference to the drawings, wherein like parts are designated by like numerals throughout.

Those of ordinary skill in the art will appreciate that various modifications to the details of the figures may easily be made without departing from the essential characteristics of the invention. Thus, the foregoing description of the invention, and the content of the figures, are intended only by way of example, and simply illustrate certain specific embodiments consistent with the invention as may be properly claimed.

Figure 1:
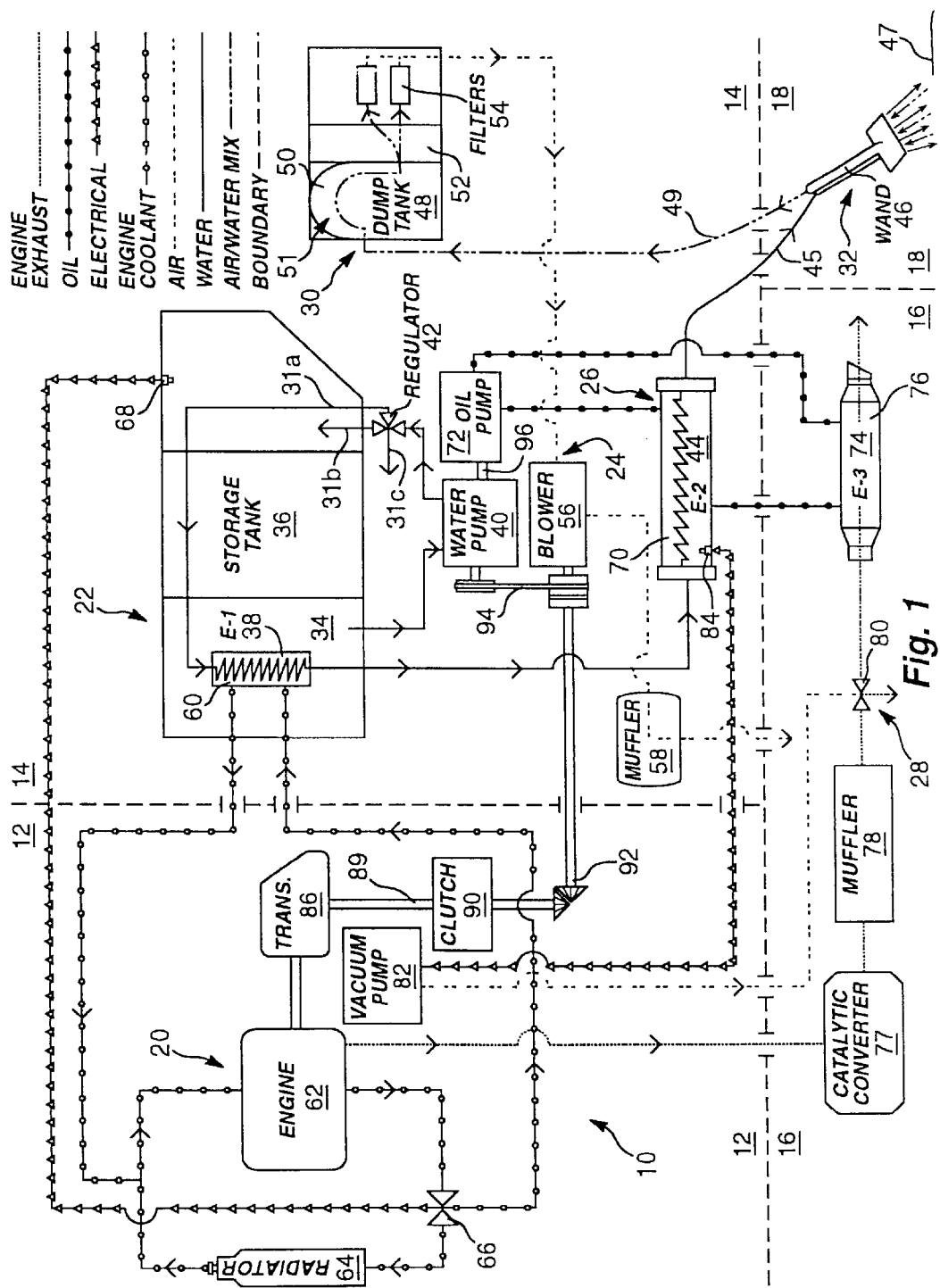
FIG. 1 is a schematic block diagram of fluid flows in one possible embodiment of the invention.

FIG. 1 is a schematic representation of a cleaning system, with which a given method of operation is provided, in accordance with the invention. A washing plant 10 is mounted on a support, such as a vehicle or trailer, having an engine compartment 12, a cargo bay 14, an undercarriage 16, and remote cleaning implements 18. Note that the dashed or phantom line in FIG. 1 represents walls and floors of a vehicle that separate the engine compartment 12 from the cargo bay 14, etc.

The engine compartment 12 contains an engine system 20. The cargo bay has a fluid storage and preheat system 22, a fluid drive system 24, a fluid top heating system 26, a portion of an intermediate fluid heating system 28 (e.g. oil heating system 28), and a waste storage system 30. The intermediate fluid heating system 28 extends outside the cargo bay 14 to reach the undercarriage 16. The remote cleaning implements 18 include a fluid applicator system 32.

The operation of the washing plant 10 may occur through a series of several steps. First, cleaning fluid 34 in a storage tank 36 receives heat while circulating around an outer shell of a first heat exchanger 38, labeled E-1 38, immersed in the storage tank 36. The resulting temperature rise provides a first or preheating stage for the cleaning fluid 34. The first heat exchanger heats the water or cleaning fluid 34 to a temperature between 90–190 degrees F. A water pump 40 draws preheated cleaning fluid 34 from a portion of the storage tank 36 near the first heat exchanger 38.

After passing through the pump 40, cleaning fluid 34 reaches a regulator 42, which acts as a three-way valve, having three outlets 43a, 43b, and 43c. If the fluid applicator system 32 is using (distributing, passing) fluid, a portion of the cleaning fluid 34 in the regulator 42 exits through an outlet 31a leading to the first heat exchanger 38. Cleaning fluid 34 not required by the fluid applicator system 32 exits through an outlet 31b to reenter the storage tank 36 directly.

A malfunction of any flow path below the regulator 42 may be reflected therein. For example, an obstruction in the regulator 42, valves, or the associated lines carrying cleaning fluid, will activate the regulator 42 to relieve the obstructed flow, directing it into the ambient through another outlet 31c. The regulator could be configured to protect against overheating, but an exhaust diverter provides a fail-safe system that does not rely on active control to ensure safety from overheating.

Cleaning fluid 34 directed to the fluid applicator 32 travels through the outlet 31a and into the first heat exchanger 38, where it circulates to more directly receive heat in a second preheating stage. In this second preheating stage, cleaning fluid 34 attains a temperature in the range of 200–205 degrees F., or, alternatively, in a range of 190–210 degrees F. The cleaning fluid 34 then exits the first heat exchanger 38, exits the storage tank 36, and enters a second heat exchanger 44, labeled E-2 44. The cleaning fluid 34 circulates through the second heat exchanger 44 to receive heat in a top-heating stage. Cleaning fluid 34 exiting the second heat exchanger 44 is at a temperature sufficient for carpet cleaning. This third heating stage raises the temperature of the cleaning fluid 34 between 235–245 degrees F. Then, the cleaning fluid 34 travels through a feed line 45 and into a wand 46, where it is directed against a surface to be cleaned, such as a carpet 47. The wand 46 may be of any type known in the art. Although the invention is described with respect to cleaning carpets, it is also suitable for cleaning upholstery on furniture, such as chairs and sofas, cleaning forced-air registers, walls, outdoor surfaces such as driveways, walkways, building exteriors such as stucco, brick, and vinyl siding, among others. Yet another application of the cleaning system is that of performing hazardous material cleanup.

A vacuum is generated in a return line 49, which is used to cause air that surrounds the remote cleaning implements 18 to enter the wand 46, thereby removing the cleaning fluid 34 from the surface being cleaned (e.g. carpet 47), and passing into a dump tank 48 via a return line 49. The cleaning fluid 34 carried in the air in the dump tank 48 enters a separator 50, which contains a cyclone 51, a deflector 52, and filters 54.

The cyclone 51 separates most liquid cleaning fluid 34 from air and vapor. Any remaining cleaning fluid 34 still entrained in air is then forced to go around a deflector 52 that directs the liquid-droplet-laden air into accumulated cleaning fluid 34 in the dump tank 48, where most droplets will be captured by surface tension. Finally, the filters 54 permit passage of air, but restrict the flow of any droplets of liquid cleaning fluid 34 and particulates of filterable size. Cleaning fluid 34 removed from air by the cyclone 51, the deflector 52, and the filters 54 collects in the dump tank 48. A second filter system can also be incorporated with tank 48 to filter the used cleaning fluid 34 to such a degree that it may be safely disposed directly to the environment or to be recycled for cleaning again in storage tank 36.

Air passing out of the dump tank 48 through the filters 54 contains only a comparatively low concentration of vaporized cleaning fluid. Even if saturated at 100 percent humidity, this air passes from the dump tank 48 to a blower 56 drawing the flow. The blower 56 creates a pressure differential to induce, or draw, air into the air channel of the wand 46 and through the return line, expelling it through a muffler 58. The muffler 58 dampens noise created by the high volumetric flow rate of the blower 56, expelled into ambient air around the washing plant 10.

The first heat exchanger 38, or E-1 38, contains a reservoir or shell, filled with heated coolant 60. Coolant 60 in the engine 62 carries excess or waste heat of combustion passed through the walls of the engine. The coolant 60 then, optionally, travels through a radiator 64, such as a convector, which cools the coolant 60 by transferring heat to air flowing through the grill into the engine compartment 12. Alternatively, a thermostatically-controlled or otherwise-controlled valve 66, can divert the coolant 60 away from the radiator 64 toward the first heat exchanger 38, for heating the cleaning fluid 34 in the storage tank 36 and in the first heat exchanger 38.

The valve 66 can be positioned in a flow of the coolant 60 to control the temperature of the coolant 60. In such a configuration, the valve 66 can operate to permit flow exclusively into the first heat exchanger 38 when the coolant 60 is sufficiently cool. Initially, on startup, such will be the case. Once heated to a maximum allowable temperature, or to a temperature sufficiently close to that of the engine, the coolant 60 may not accept enough heat to sufficiently cool the engine. Therefore, when the first heat exchanger 38, alone, is not removing an adequate amount of heat from the coolant 60, the valve 66 can direct flow into both the radiator 64 and the first heat exchanger 38. In one embodiment, an automotive thermostat can serve as the control valve 66.

Alternatively, a remote sensor 68 in the storage tank 36 can provide a temperature reading of a fluid at a different location. For example, the remote sensor 68 can be placed in the storage tank 36 to measure the temperature of the cleaning fluid 34. The remote sensor 68 can then signal the valve 66 to shunt coolant 60 into the radiator 64 when the temperature of the coolant 60 or of the cleaning fluid 34 in the storage tank reaches a level where cooling of engine 62 by heat exchanger 38 is insufficient. This diverts at least a portion of coolant 60 back through radiator 64 for adequate cooling of engine 62.

The second heat exchanger 44 or E-2 44 may be of a shell type, a shell filled with an intermediate heat transfer fluid 70. Any fluid 70 with a freezing point safe for exposure to seasonal ambient temperatures may suffice. Intermediate heat transfer fluid 70 is suitable, and means any suitable, intermediate, heat-transfer fluid 70. The intermediate heat transfer fluid 70 is pressurized by an intermediate fluid pump such as oil pump 72. The oil pump 72 circulates the intermediate heat transfer fluid 70 between the second heat exchanger 44 and a third heat exchanger 74, labeled E-3 74.

Exhaust 76 from the engine 62 can flow through a catalytic converter 77 and a muffler 78 before reaching a diverter 80 or a valve 80. The valve 80 can be pressure-actuated by a vacuum source 82, driven by the engine 62. A bias is built into the valve 80, but can be optional. The default positioning of the valve 80 passes exhaust directly to the environment, exposing none of the cleaning fluid 34 to the exhaust flow. The result is a fail-safe diverter. Any failure results in no substantial heat input from the exhaust flow to the cleaning fluid.

The vacuum source 82 may be the engine manifold or a pump 82 of a type that is continually coupled to the engine 62 to perform functions necessary for the engine system 20. When the vacuum pump 82 is connected to the valve 80, low pressure in the valve 80 may be used to actuate the valve 80 to direct exhaust 76 through the third heat exchanger 74 to heat the intermediate heat transfer fluid (e.g. oil) 70.

A thermostat 84 in the intermediate heat transfer fluid 70 measures the temperature thereof, and disconnects the vacuum pump 82 from the valve 80 when the temperature exceeds a selected value. When the vacuum pump 82 is disconnected, higher pressure in the valve 80 actuates the valve 80 to divert the flow of exhaust 76 to flow directly out of the washing plant 10 without traveling through the third heat exchanger 74. Regulating the temperature of the intermediate heat transfer fluid 70 in this manner also serves to regulate the temperature of the cleaning fluid 34, because the intermediate heat transfer fluid 70 provides the top heating stage to the cleaning fluid 34. Thus, it is the temperature of the intermediate heat transfer fluid 70 that most directly determines the temperature of the cleaning fluid 34 that reaches the carpet 47.

The engine 62 transmits mechanical power to a transmission system 86, which includes a transmission, and possibly a transfer case. A power takeoff 88, or PTO 88, extends from the transmission system 86 (e.g. either a transmission or transfer case) to permit further transmission of mechanical power to the fluid drive system 24. A clutch 90 links the PTO 88 to a first mechanical coupling 92 when activated by a user. The clutch 90 is placed downstream (with respect to power flow) of the transmission system 86 to avoid additional wear on the transmission system 86 from repeated engagement and disengagement with the PTO 88. Thus, the PTO 88 may remain continually-meshed with the transmission system 86. This permits the apparatus 10 to avoid the problems that may otherwise result from frequent engagement and disengagement of gear members.

The clutch 90 can be one of many types known in the art, such as mechanical, hydraulic, and hydraulically actuated clutches. A hydraulically actuated clutch is, however, preferable. The first mechanical coupling 92 can include one or more coupling systems known in the art such as shafts, spur gears, worm gears, racks, pinions, bevel gears, u-joints, slip shafts, splined shafts, belts, pulleys, chains, cams, levers, and hydrostatic systems.

The first mechanical coupling 92 then transmits mechanical power from the PTO 88 to the blower 56. A second mechanical coupling 94 is connected to the blower 56 to transmit mechanical power to the water pump 40. The second mechanical coupling 94 may be of any type known in the art, such as those mentioned above in connection with the first mechanical coupling 92. However, the second mechanical coupling 94 is shown to be a belt and pulley system.

A third mechanical coupling 96 is connected to the water pump 40 to transmit mechanical power to the intermediate heat transfer fluid pump 72. The third mechanical coupling 96 can also be of any type known in the art, such as those mentioned in connection with the first mechanical coupling 92. However, the third mechanical coupling 96 shown includes a direct drive shaft extending from the water pump 40 directly to the intermediate heat transfer fluid pump 72.

Figure 2:
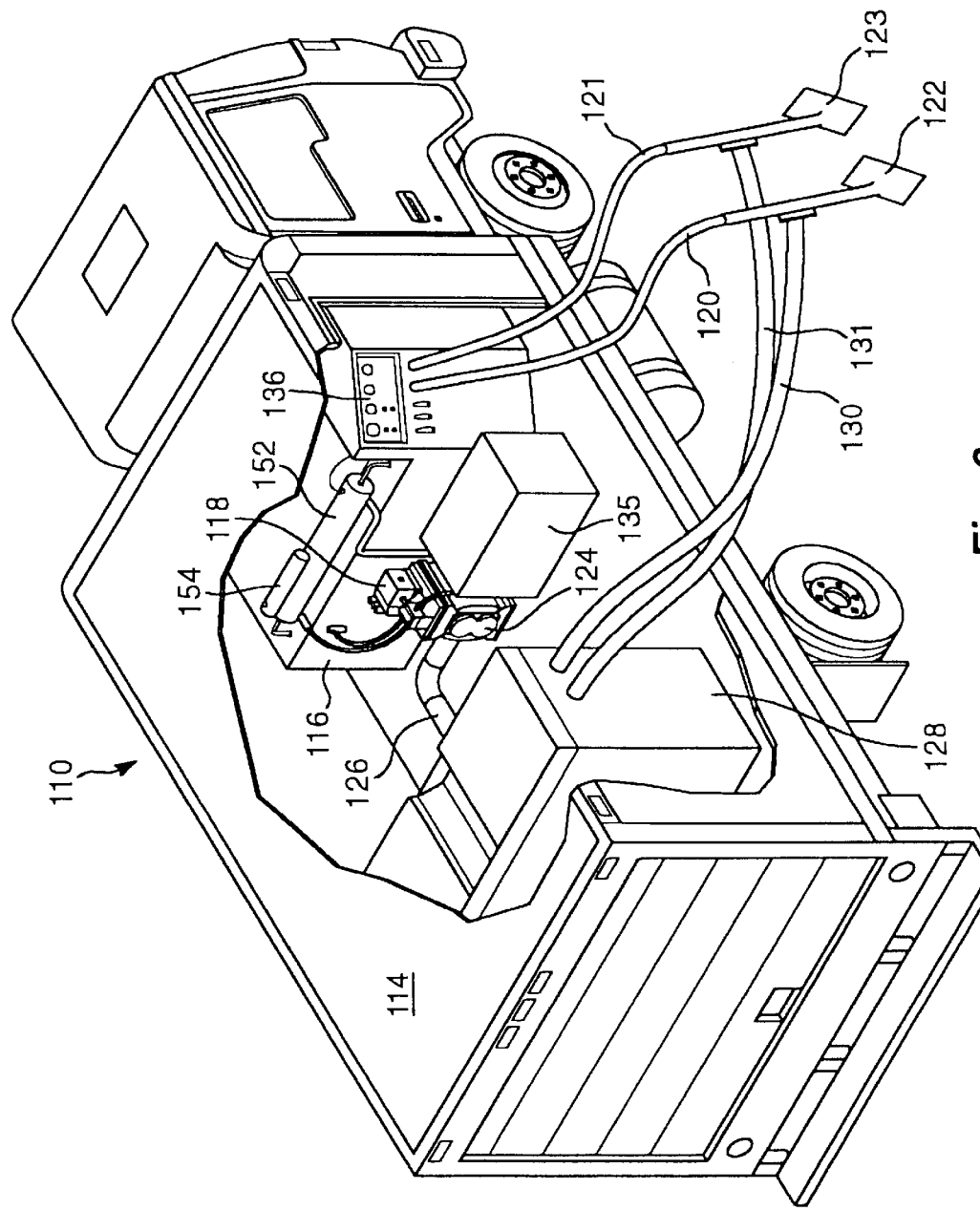
FIG. 2 is a perspective, cutaway, rear-quarter-view of a truck equipped with one embodiment of an apparatus in accordance with the invention.

The various systems of the present invention will now be described in greater detail, with reference to certain presently illustrated embodiments of the components implementing the apparatus 10. As illustrated in FIG. 2, a washing plant 110 is mounted on a truck 112. The truck 112 shown has a large cargo bay 114 for storing, protecting, and conveying washing equipment to and from the cleaning site. In an alternative embodiment, truck 112 can actually be a trailer with its own motor provided that is utilized to power apparatus 10. A tank 116 in the cargo bay 114 stores a reservoir of the cleaning fluid 117 used to clean carpets. The cleaning fluid 117 can utilize liquid water, steam vapor, or two-phase steam as its principal constituent. Cleaning chemicals may also be added. An apparatus and method in accordance with the invention provide water hot enough to clean carpets well, even without chemical additives. A pre-spray or pre-clean system, however, may be used to enhance cleaning. The apparatus 10 may be used to spot clean areas of heavy soiling prior to general cleaning. The apparatus 10 may also be utilized to clean other surface rather than solely carpets. These other surfaces can include tile, vinyl, concrete, cement, asphalt, brick, stucco, marble, granite, upholstery, automobiles, construction equipment, or glass, but not limited thereto.

An equipment operator fills the tank 116 with cleaning fluid 117 before driving the truck 112 to a cleaning site. Cleaning fluid 117 in the tank 116 is heated en route to the site. Once the washing plant 110 reaches a cleaning site, a water pump 118 in the cargo bay 114 conveys cleaning fluid 117 through a first water conduit 120 and possibly a second water conduit 121. From the first and second water conduits 120 and 121, the cleaning fluid 117 passes to a first wand 122 and a second wand 123 passed over an area to be cleaned by operators. The washing plant 110 delivers sufficient heat, pressure, and fluid flow rates to permit the simultaneous use of both wands 122 and 123. Alternatively, multiple wands 122 and 123 can be included, which can exceed two wands where apparatus 10 can service as many as 10 wands with sufficient power and cleaning fluid for proper operation. Also, but a single wand 122 can be incorporated into apparatus 10 where only a single operator is available to operate apparatus 10 to perform the desired cleaning operation.

A blower 124 in the cargo bay 114 generates a vacuum by drawing air through a tube 126 from a dump tank 128. The vacuum drawn in the dump tank 128 induces an air flow through a first conduit 130 and a second conduit 131, which are connected to the first and second wands 122 and 123. Thus, a vacuum is created proximate the surface of the carpet being cleaned, thereby drawing the cleaning fluid 117 and particulate matter from the carpet, through the first and second conduits 130 and 131, and into the dump tank 128. Air drawn from the dump tank 128 exits the blower 124 through a tube 132 that leads to a muffler 135 (shown in FIG. 5), which reduces noise generated by the blower 124. A cover 135 over the muffler serves to attenuate the noise further from the blower 124. A control panel 136 mounted on the tank 116 is accessible to an operator to provide diagnostic information and controls for optimizing the performance of the washing plant 110.

Figure 3:
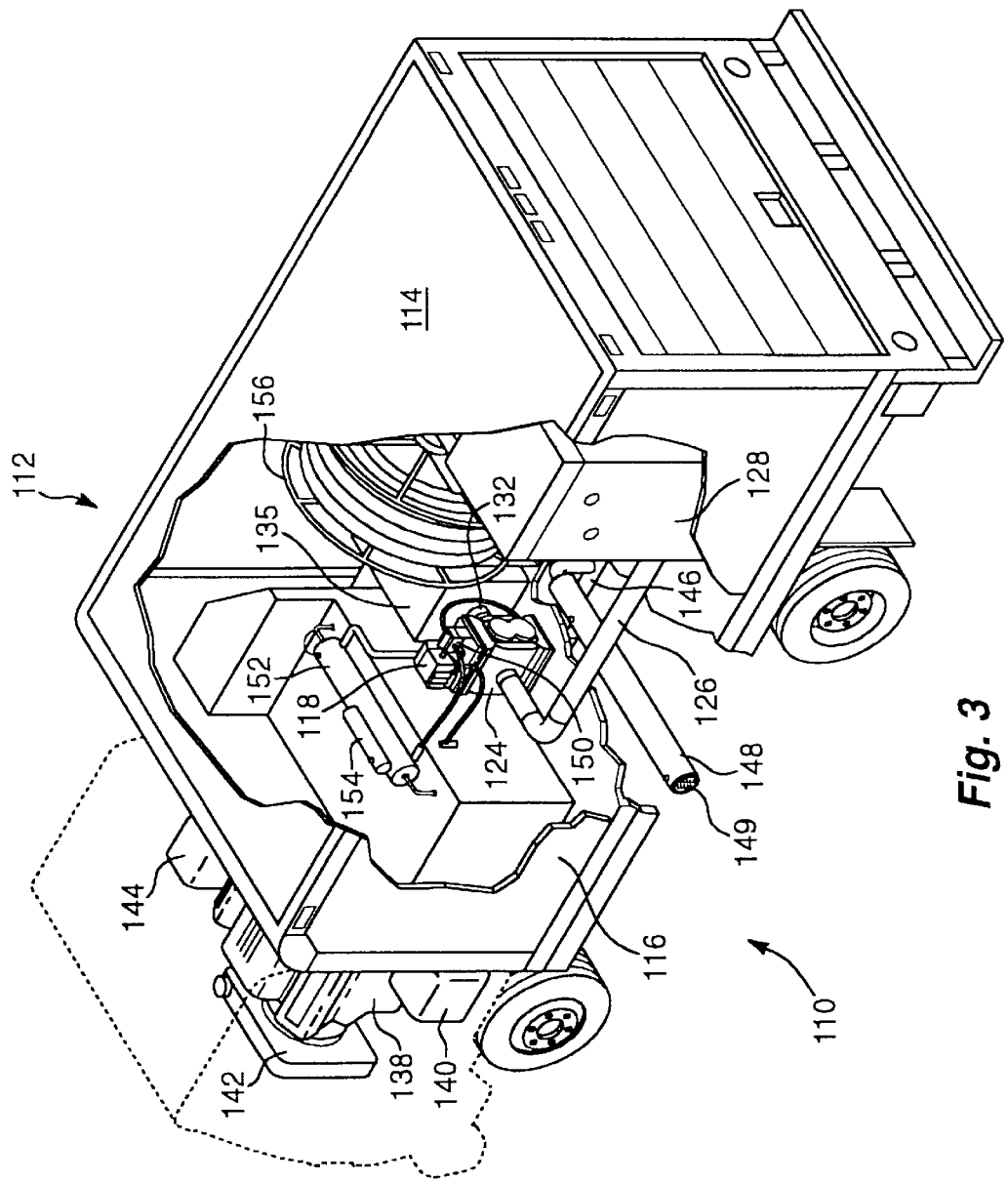
FIG. 3 is a perspective, cutaway, left, rear-quarter view of the truck of FIG. 1, shown from a different angle with coiled vacuum tubing stored in the cargo compartment.

FIG. 3 shows one presently preferred embodiment of a washing plant 10 of FIG. 2 from a different viewpoint. A portion of the truck 112 has been shown in phantom lines to reveal an engine 138, a transmission system 140, a radiator 142, and a vacuum pump 144 for creating a vacuum 145 in relation to gauge, or atmospheric pressure. A line 146 conveys exhaust 147 from the engine 38 to a third heat exchanger 148 located directly below the cargo bay 114; the exhaust 147 leaves the third heat exchanger 148 via an outlet 149. An intermediate fluid pump 150, or intermediate heat transfer fluid pump 150, circulates an intermediate heat transfer fluid 151, or oil 151, through the third heat exchanger 148 to draw heat from the exhaust 147 into the intermediate heat transfer fluid 151.

The intermediate heat transfer fluid 151 circulates through a second heat exchanger 152. Cleaning fluid 117 flows through the second heat exchanger 152 to draw heat from the intermediate heat transfer fluid 151. Since the intermediate heat transfer fluid 151 expands when heated, an expansion tank 154, which is attached to the second heat exchanger 152, provides buffer space for extra intermediate heat transfer fluid 151 overflowing from the second heat exchanger 152 during operation of the washing plant 110. The cleaning fluid 117 exits the second heat exchanger 152, briefly reenters the tank 116, and then leaves the tank 116 to reach the first or second wands 122 or 123 via the first and second water conduits 102 and 121. A rack 156 may be included as shown in FIG. 2 to safely and conveniently store the water conduits 120 and 121 and the conduits 130 and 131 for transportation to or from a site.

The various systems 20, 22, 24, 26, 28, and 30 of the invention will now be described in further detail, as contemplated by the embodiment of FIGS. 2 and 3. These systems 20, 22, 24, 26, 28, and 30 correspond to those depicted in FIG. 1. Other configurations and systems may be used within the spirit and scope of the invention.

FIG. 4 illustrates the engine system 20. The engine 138 can be any type of internal combustion engine. Engine 138 can also be designed to tolerate operation at comparatively modest speeds while stationary for long periods of time. Such performance is well suited to a diesel cycle engine. A diesel cycle also provides comparatively higher torque at a lower rotational rate (angular velocity) with a lower net fuel consumption than a comparable gasoline cycle. In another embodiment, engine 138 can also be a turbine engine with heating and pumping stages adapted to drive system 10 in accordance with the present invention.

The line 146 conveys exhaust gas 147 away from the engine 138 to the third heat exchanger 148. The transmission system 140 provides gearing to maintain a consistent load on the engine at different speeds and may include a transfer case. The power takeoff (PTO) 158 extends from the transmission system 140 to provide power to mechanically-driven components of the washing plant 110. The PTO 158 extends to a clutch 160, which couples the PTO 158 to a shaft 161 when engaged by a user.

The vacuum pump 144 operates a safety cutoff designed to stop the transfer of heat to the intermediate heat transfer fluid 151 in the third heat exchanger 148 when the intermediate heat transfer fluid 151 becomes too hot. The vacuum pump 144 can be continually driven by the engine 138 to provide a vacuum (with respect to gauge pressure). A vacuum 145 also exists in the line 162 when the line 162 is connected to the vacuum pump 144.

Controls can be operated with either sense (direction, or state) as active and the other a default. However, safety may be best served by carefully selecting default positions for control systems. For example, a valve 163 may support the vacuum 145 in the line 162 when the temperature of the intermediate heat transfer fluid 151 does not exceed a selected, permissible level. When the temperature of the intermediate heat transfer fluid 151 is higher than a specified value, the line 164 may signal the valve 163 to disconnect the line 162 from the vacuum pump 144 so that the line 164 is no longer evacuated. When no vacuum remains in the line 162, the third heat exchanger 148 effectively receives no exhaust heat. The valve 163 is selected to be failsafe, so that unless affirmatively activated by a vacuum originating in a functioning (rotating) engine system 20, the valve 163 closes by default against heat exchange, to divert exhaust to the environment. Thus, the default position directs exhaust away, as if no heat exchanger 148 existed, keeping the intermediate heat transfer fluid 151 from overheating.

The radiator 142 can be thought of as a liquid coolant reservoir designed to conduct heat from the engine 138 to the ambient air, which serves as a heat sink. The coolant 165 can be one of any number of fluids such as water, glycol, or a water/glycol mixture. A thermostatic valve 66 of the engine can serve to direct coolant. Even a remotely located or remotely controlled valve 168, however, can operate effectively the same as an integrated thermostatic valve 66, 168.

The line 116 conveys coolant 165 from the engine 138 to a thermostatically controlled valve 168. The valve 168 can operate autonomously with integrated control (e.g. like a conventional thermostatic valve), or can be controlled by signals through a line 169 from a remote sensor. When the cleaning fluid 117 in the tank 116 is comparatively cool, the valve 168 can shunt all coolant 165 to the line 170 leading to the tank 116.

When, however, the coolant 165, or the cleaning fluid 117 in the tank 116, has become too hot either to accept enough heat to cool the engine 138, or to transfer heat to the cleaning fluid, the valve 168 restricts the line 170 or otherwise circulates the coolant 165 through the radiator 142. Alternatively, the valve 168 may be a flow divider proportioning the flow of coolant 165 between the radiator 142 and the tank 116 by any suitable means.

Coolant 165 leaves the radiator through a line 172 to reach a junction 174, to be joined by any coolant 165 portion leaving the tank to return to the engine 138. The valve 168 is preferably failsafe so that in the absence of an affirmative signal, the line 170 to the tank 116 is closed off, sending all coolant through he vehicle radiator 142 to ensure that the engine 138 cannot overheat.

FIG. 5 shows the fluid drive system 24. A shaft 177, coupled to the shaft 161 and extending from the clutch 160 and underneath the cargo bay 114, terminates in a pulley 178 under the blower 124. Any suitable driving connection 180 will suffice. At this juncture, a belt 180 may be engaged by the pulley 178, extending up through an opening in the floor 179 of the cargo bay 114 to reach another pulley 184 rotatably coupled to the blower 124.

When the clutch 160 is engaged, the shaft 177 turns the pulley 184 to operate the blower 124. A second belt 186 may extend from the pulley 184 to reach an additional pulley 188, which drives the water pump 118. A shaft 189, affixed to rotate with the pulley 188, extends through the opposite side of the water pump 118 to drive the intermediate heat transfer fluid pump 150 (e.g. oil pump 150).

The blower 124 draws air through the tube 126 and expels it through the tube 132 and into the muffler 134 (shown without the cover 135). The water pump 118 draws cleaning fluid 117 from the tank 116 through the line 190 and expels it to the regulator 191 via the line 192. Likewise, the intermediate heat transfer fluid pump 150 draws intermediate heat transfer fluid 151 through the line 194 from the second heat exchanger 152 and expels it through the line 196 to the third heat exchanger 148.

Although many of the pumps and regulators are shown to be pulley or mechanically driven, each of the pumps can be electrically driven with an electro-magnet motor powered by an electrical power supply driven by engine system 20. An alternator, coupled to engine system 20 can be provided to supply sufficient enough electrical energy to drive all pumps and regulators, instead of rely exclusively upon mechanical force of pulley drives. Further, a mixture of mechanical and electro-magnet derived power can be incorporated within the present invention as is practicable by the design of those skilled in the art.

Figure 6:
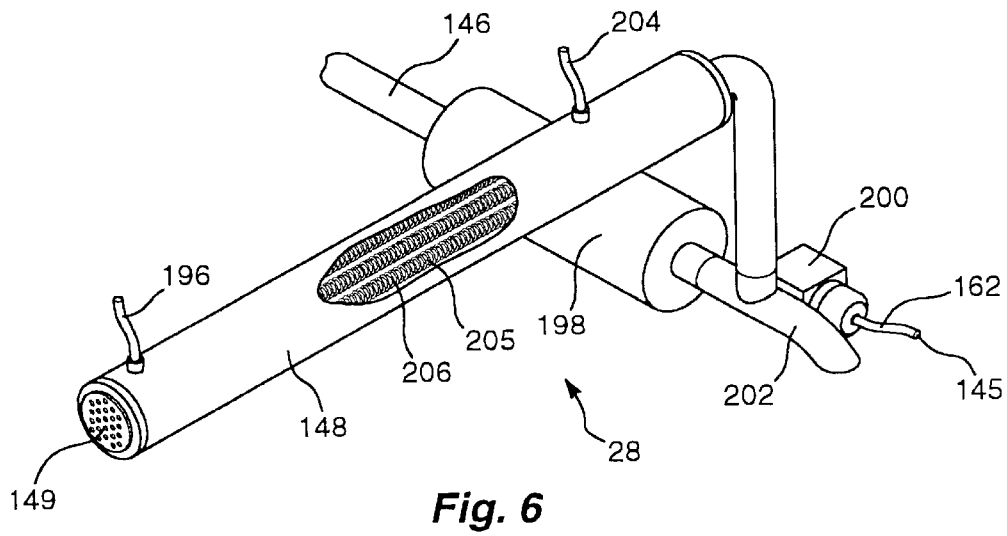
FIG. 6 is a perspective view of one embodiment of an intermediate thermal fluid heating system suitable for the apparatus of FIG. 1.

FIG. 6 depicts the intermediate heat transfer fluid heating system 28. Exhaust 147 from the engine 138 travels via the line 146 under the cargo bay 114 and passes through a muffler 198 to decrease engine noise. The exhaust 147 reaches a diverter 200 controlled by air pressure in the line 162 from the vacuum pump 144. When the line 162 is at a negative gauge pressure, the diverter 200 shunts the exhaust 147 into the third heat exchanger 148. After giving off heat in the third heat exchanger 148, the exhaust 147 exits via the outlet 149. Alternatively, when the line 162 is not evacuated, the diverter 200 blocks the third heat exchanger 148 and channels the exhaust 147 out of the washing plant 110 through the tailpipe 202. The vacuum control concept is straightforward, stable, and fail-safe. However, any suitable control mechanism may control actuation of the diverter valve 200 in order for the exhaust flow to bypass the third heat exchanger 148, unless the cleaning fluid is present to prevent a temperature runaway or equipment damage.

Regardless of whether the exhaust 147 is flowing through the third heat exchanger 148, intermediate heat transfer fluid 151 continues to flow into the third heat exchanger 148 from the intermediate heat transfer fluid pump 150 via the line 196 and out of the third heat exchanger 148 via the line 104, which leads to the second heat exchanger 152. The intermediate heat transfer fluid 151, or any suitable alternative heat transfer fluid 151, should preferably be of a type that will not freeze, gel, or thicken excessively at ordinary, seasonal, outdoor ambient temperatures. The third heat exchanger 148 may preferably be located outside the cargo bay 114, due to the danger of channeling exhaust gases through an enclosed portion of a vehicle.

When the washing plant 110 is not operating, the intermediate heat transfer fluid 151 (e.g. oil, alcohol, saline, etc.) may be left in the third heat exchanger 148 without a heat source. If plain water instead of the intermediate heat transfer fluid 151, or other non-freezing heat-transfer fluid 151, were used for the intermediate heat transfer fluid 151, the water could freeze, and the third heat exchanger 148, the line 196, the line 204, or all of them could be damaged.

The third heat exchanger 148 comprises low fin tubing "Low fin" is a term of art used to describe short radially extending, sometimes helical threads formed on a tube to be positioned in a fluid flow of a heat exchanger. Exhaust gases 147 flowing into the third heat exchanger 148 may be distributed among several tubes 205. Tubes 205 may be narrow and positioned such that intermediate heat transfer fluid 151 can flow between them. Fins 206 (e.g. Helical thread 206) on the tubes 205 increase the total surface area available to intermediate heat transfer fluid 151 to allow greater heat transfer from exhaust 146 to intermediate heat transfer fluid 151 via tubes 205. The threads 206 also increase the surface area through which exhaust heat can be conducted and converted to the intermediate heat transfer fluid 151. Both enhanced fluid motion and the enlarged interface surface area improve heat transfer between the tubes 205 and the intermediate heat transfer fluid 151. Fins 206 can be formed that increase the total surface area of the exterior of tubes 205 to as much as 2.5 times the regular surface area of tubes 205 without any threads formed therein. Further, fins 206 need not be formed directly in tubes 205, but can be formed by adding a second metal, the same as or different than that used for tube 205, to increase the total surface area of tubes 205 by forming the second metal into fins for increased heat dissipation. Further still, the threads 206 can be placed on the interior surface of tubes 205 as well.

As a result, a heat exchanger utilizing low fin tubing has on the order of two-and-a-half times the heat transfer capability of a comparable heat exchanger with no such tubing. Low fin tubing heat exchangers have never been used in previous carpet-cleaning machines. Part of the reason may be because the high heat transfer rate causes the water to leave deposits of lime, magnesium, calcium, and other minerals, thereby fouling (coating) the surfaces of the heat exchanger with insulators. This problem is solved by the present invention through the use of, among other things, the intermediate heat transfer fluid 151 to transfer the heat from the exhaust 147 to water lines. 120, 121 in a separate heat exchange process.

Figure 7:
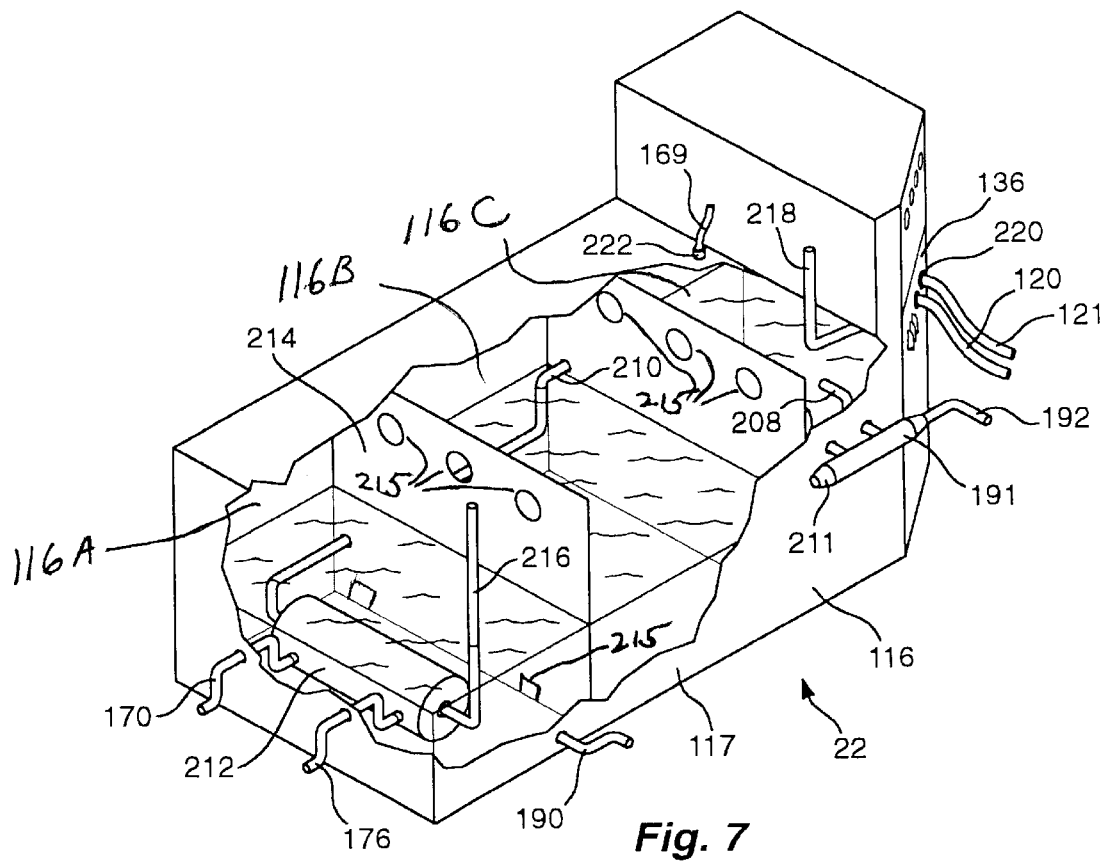
FIG. 7 is a perspective view of one embodiment of a fluid storage and preheat system suitable for the apparatus of FIG. 1.

FIG. 7 shows the fluid storage and preheat system 22. The line 192 from the water pump 118 conveys cleaning fluid 117 to the regulator 191, which sends some of the cleaning fluid 117 directly back into the tank 116 via a line 208. If an operator is using a wand 122, 123 to apply cleaning fluid 117 to a carpet, the regulator 191 also sends a portion of the cleaning fluid 117 through the line 210. The line 210 goes through the tank 116, but is sealed away from the cleaning fluid 117 in the tank 116. The regulator 191 also contains an outlet 211 to expel the cleaning fluid 117 into the environment or to the cargo bay 114 if the pressure inside the regulator 191 exceeds a set safety limit. Tank 116 is further divided into compartments, including compartment 116A, 116B, and 116C, by baffles 214. Each compartment 116A–C is in fluid communication with one another, but in a controlled manner so that more efficient heating of cleaning fluid 117 can be achieved. Tank 116 can have one or more compartments, according to the design of the skilled artisan.

Fluid traveling through the line 210 reaches a first heat exchanger 212 immersed in the cleaning fluid 117 in compartment 116A of storage tank 116. Compartment 116A provides a smaller volume of cleaning fluid 117 to be heated in this first heat exchange stage. Heated coolant 165 from the engine 138 enters the first heat exchanger 212 via the line 170 and exits via the line 176. The heated coolant 165 within the first heat exchanger 212 serves a dual function. The coolant may pass through the tubes or the shell of the heat exchanger 212. Passing the coolant 165 through the shell provides heat transfer to the cleaning fluid 117 in the bulk of the tank 116, as well as to that passing though the internal tubes of the heat exchanger 212. The illustrated embodiment provides two heat exchange processes into the cleaning fluid 117.

First, the heat exchanger 212 heats the ambient cleaning fluid 117 in compartment 116A through the shell. The portion of cleaning fluid 117 in the vicinity of the first heat exchanger 212 may remain somewhat hotter than the remaining cleaning fluid 117 in the other compartments 116B and 116C of tank 116 if the baffles 214 are configured to limit fluid circulation within the tank 116. Thus, cleaning fluid 117 drawn from the tank 116 through the line 190 may be at a comparatively higher temperature than tat of the remaining cleaning fluid 117 in the tank 116. This heating occurs independently from any movement of cleaning fluid 117 by operation of the pump 118 and PTO 158. The cleaning fluid 117 can receive heat while the blower 124, the water pump 118, and the intermediate heat transfer fluid pump 150 are not operating. The cleaning fluid 117 in the tank 116 may thus be heated by engine coolant during virtually the entire transit time to a cleaning site. Additionally, the baffles 214 can have openings 215 strategically placed at the tops and bottoms to provide fluid flow between adjacent compartments.

Second, cleaning fluid 117 entering the first heat exchanger 212 from the line 210 travels through a series of tubes, which can be configured as helically-twisted coils (not shown) within the first heat exchanger 212 to increase the surface area and path length (and reduce the hydraulic diameter, 4×CS Area/Wetted Perimeter) through which heat can move from the coolant 165 to the cleaning fluid 117. Therefore, as cleaning fluid 117 exits the first heat exchanger 212 through a line 216, it will be at a temperature higher than that of the bulk cleaning fluid 117 in compartment 116A, or any other compartment, of the tank 116.

After passing through the second heat exchanger 152, the cleaning fluid 117 may re-enter the tank 116 via the line 218, exiting out of the tank 116 through a hookup 220 (fitting 220) connected to the conduit 120. In one alternative embodiment, a sensor 222 is provided to sense the temperature of the cleaning fluid 117 in the tank 116, compare that temperature to a preset limit, and transmit a corresponding signal via the line 169 to the valve 168 controlling flow. Alternatively, the valve 168 can be an independent, integrated (e.g. automotive) thermostat positioned to control the flow of the coolant 165 based on local temperature.

Figure 8:
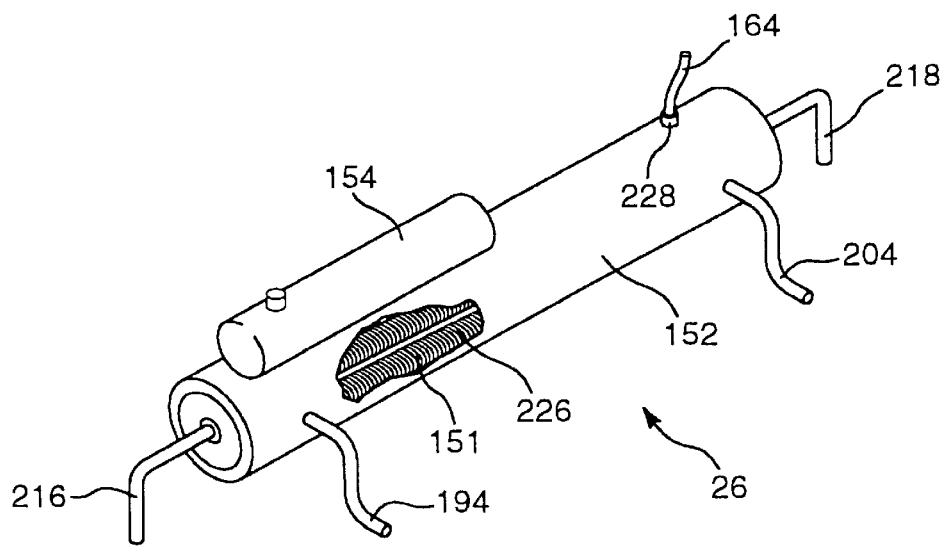
FIG. 8 is a perspective view of one embodiment of a fluid top heating system suitable for the apparatus of FIG. 1.

FIG. 8 illustrates a perspective, partial cut-away view of the fluid top-heating system 26. Intermediate heat transfer fluid 151, heated by passing through the third heat exchanger 148, enters the second heat exchanger 152 via the line 204 and exits to the intermediate heat transfer fluid pump 150 via the line 194. The line 216 conveys the heated cleaning fluid 117 out of the tank 116 and into the second heat exchanger 152 for further heating.

Cleaning fluid in the second heat exchanger 152 travels through sets of helically-twisted coils 226, similar to those in the first heat exchanger 212. The coils 226 improve the efficiency of heat transfer between the intermediate heat transfer fluid 151 and the cleaning fluid 117 by conducting the cleaning fluid 117 through a larger area, smaller hydraulic diameter, and longer path through the intermediate heat transfer fluid 151. The coils 226 in one embodiment are about 160 feet in length with a one-quarter-inch inside diameter. Other dimensions and lengths are contemplated to be within the scope of the present invention. For example, the length can be between 100–250 feet with a corresponding inside diameter from one inch to as small as one-eighth-inch.

In one alternative embodiment, a thermostat 228 controls the temperature of the intermediate heat transfer fluid 151 against a preset limit. For example, a remote sensor transmits a corresponding signal via the line 164 to the valve 163. Alternatively, an integrated, self-regulating thermostat 228 can be positioned within a separate enclosure on one of the lines 194, 196, or 204 carrying intermediate heat transfer fluid 151. Alternatively, the thermostat 228 can be mounted in the second heat exchanger 152, as depicted in FIG. 8.

Figure 9:
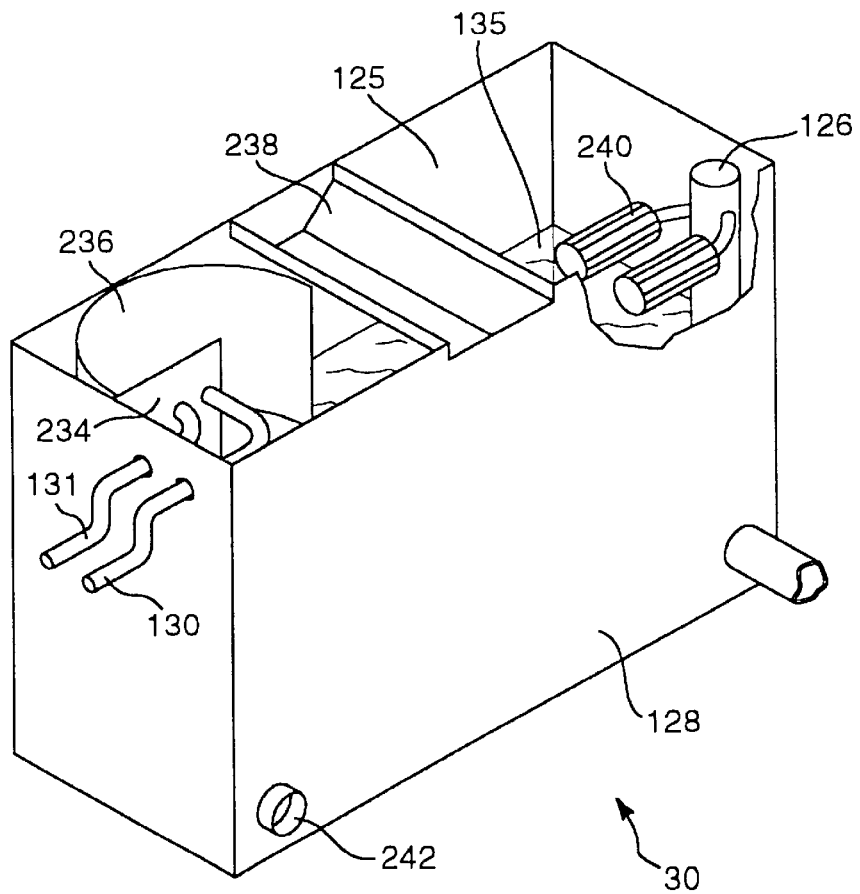
FIG. 9 is a perspective view of one embodiment of a waste storage system suitable for the apparatus of FIG. 1.

The waste storage system 30 is shown in greater detail in FIG. 9, which illustrates a perspective partial cut-away view thereof. The waste storage system 30 has first and second conduits 130 and 131 to draw air into the dump tank 128. The first and second conduits 130 and 131 are mounted to a baffle 234 facing into a cyclone baffle 236, curved to divert the incoming air to form a whirling, cyclonic flow. Air and water vapor, with entrained water droplets and soil, impinge against he cyclone baffle 236 and begin to swirl. Air and vapor move to the center of the vortex, while centrifugal effects move liquids and solids outward. The baffle 234 creates a barrier to ensure that water and soil entering the dump tank 128 drop out quickly in the pass against the cyclone baffle 236.

The air is drawn by vacuum across another baffle 238 extending across the middle of the dump tank 128. The baffle 238 is a barrier to liquid and solids and diverts the movement of warn, moist air, which condenses against he baffle 238 and by direct contact with liquid in the dump tank 128. The flow underneath the baffle 238 eventually reaches the filters 240. As air is drawn through the filters 240, any remaining particulate matter and liquid droplets are trapped in the dump tank 128 by the filters 240. All but a small concentration of vaporized cleaning fluid remains in the dump tank 128. After going through the filters 240, the air moves through the tube 126 drawn to the blower 124. The dump tank 128 may be emptied through a drain 242 at the bottom of the dump tank 128. Alternatively, the collected cleaning solution 135 can be further filtered with a filter means sufficient to clean the solution 135 and re-utilize the cleaned solution again within system 10 for cleaning purposes.

Figure 10:
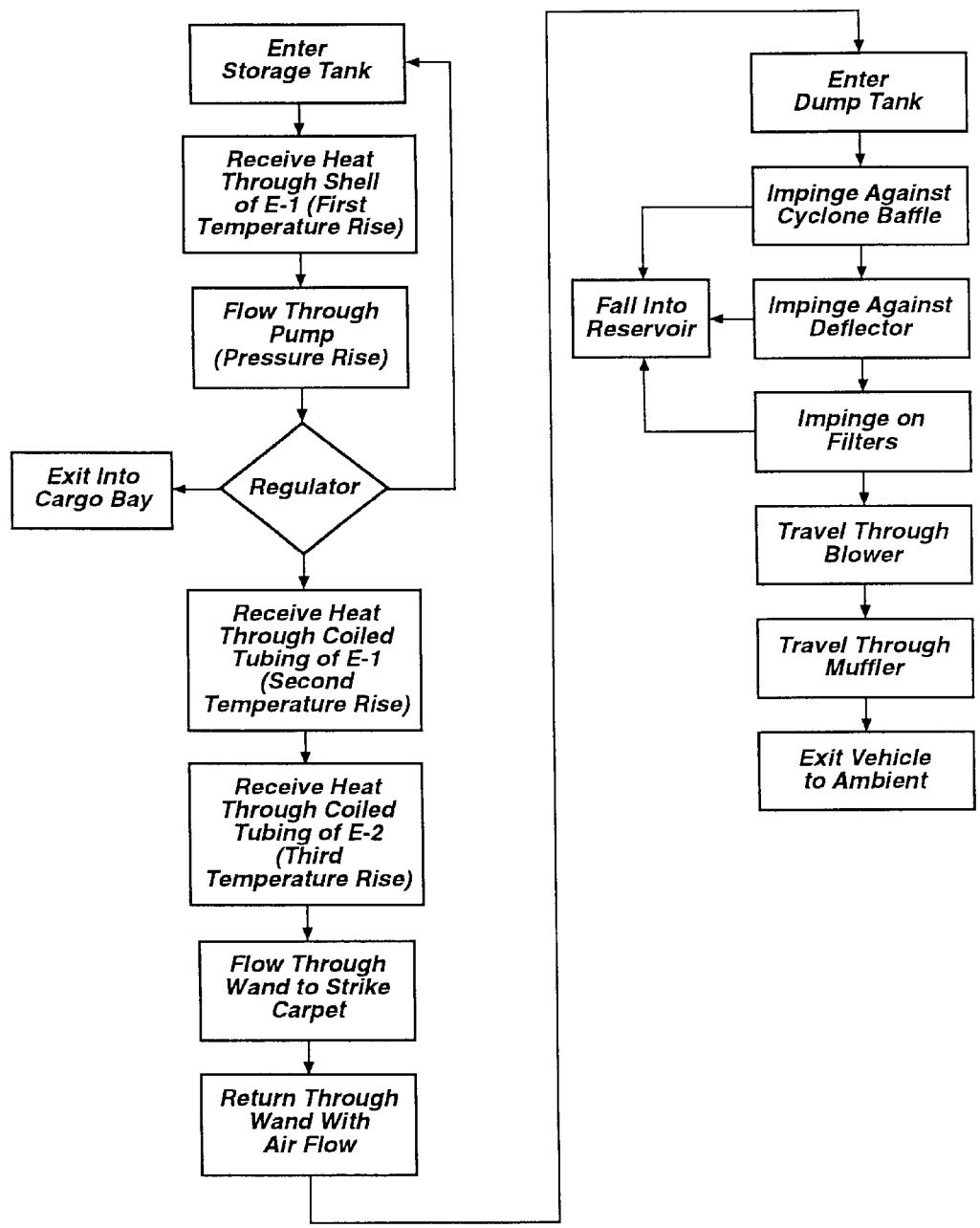
FIG. 10 is a schematic block diagram, a flowchart showing one possible flow of cleaning fluid in accordance with the invention.
Figure 11:
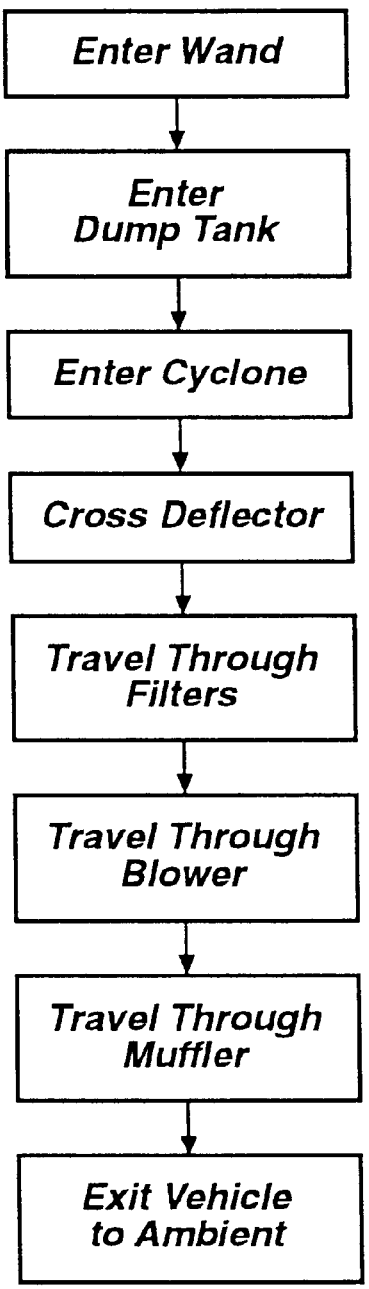
FIG. 11 is a schematic block diagram or flowchart showing one possible flow of air in accordance with the invention.

The invention contemplates not only a novel apparatus, but also a collection of novel steps for improved carpet cleaning. In order to effectively suspend or dissolve particulates and other soiling agents found in carpet, an apparatus should provide a high flow rate of cleaning fluid at a high temperature and pressure. In addition, a high flow rate of air at a low pressure is required to remove fluids and soils from a carpet. FIGS. 10 and 11 show air and water flows having the proper characteristics for carpet cleaning.

FIG. 10 illustrates one current embodiment of a flow path for cleaning fluid 117 through the washing plant 110. An operator fills the storage tank 116 with cleaning fluid 117. This cleaning fluid 117 undergoes a first temperature rise, or first preheat, as it receives heat through an outer shell of the first heat exchanger 212. The water pump 118 imparts a pressure rise to the cleaning fluid 117 while drawing from the storage tank 116 for pumping fluid 177 to the regulator 191.

The regulator 191 may expel the cleaning fluid 117 for safety's sake as discussed above. Otherwise, the regulator 191 sends the portion required for immediate cleaning through the first heat exchanger 212, and conveys the remainder back into the storage tank 116.

Cleaning fluid 117 in the first heat exchanger 212 circulates through the tubes (e.g. coils) of the first heat exchanger 212 to receive a second temperature rise, or second preheat. The cleaning fluid 117 exits the first heat exchanger 212 to enter the second heat exchanger 152, where it circulates to receive a third temperature rise, or top heat. After the top heating stage in the second heat exchanger 152, the cleaning fluid 117 flows through the first 122 or second wand 123 to strike the surface of a carpet.

Air conveys the cleaning fluid 117 from the carpet to the dump tank 128. There, moisture is removed from the air as it passes through the cyclone baffle 234, the deflector 238, and the filters 240, as described above. The remaining moisture exits the dump tank 128, primarily as water vapor, travels through the blower 124, passes through the muffler 134, and exits the washing plant 110.

FIG. 11 depicts one embodiment of a flow path of air through the washing plant 110. Air surrounding the surface of a carpet is drawn through the first 122 or second wand 123 and into the dump tank 128. The air hits the cyclone baffle 234, creating a cyclone separator. Air then crosses the deflector 238, and moves through the filters 240 before being drawn into the blower 124. The blower 124 imparts a pressure rise to the air, which then passes through the muffler 134 before exiting the washing plant 110.

In order to provide the proper temperatures, pressures, and flow rates in the cleaning fluid 117 and air, energy is added in the course of the fluid flows depicted in FIGS. 10 and 11. The transfer of energy into the working fluid is, however, only one step in an energy delivery and conversion process that begins in the engine 138. FIGS. 12–15 show how one embodiment for passing energy from the engine 138 to the flows of air and water shown in FIGS. 10 and 11.

Figure 12:
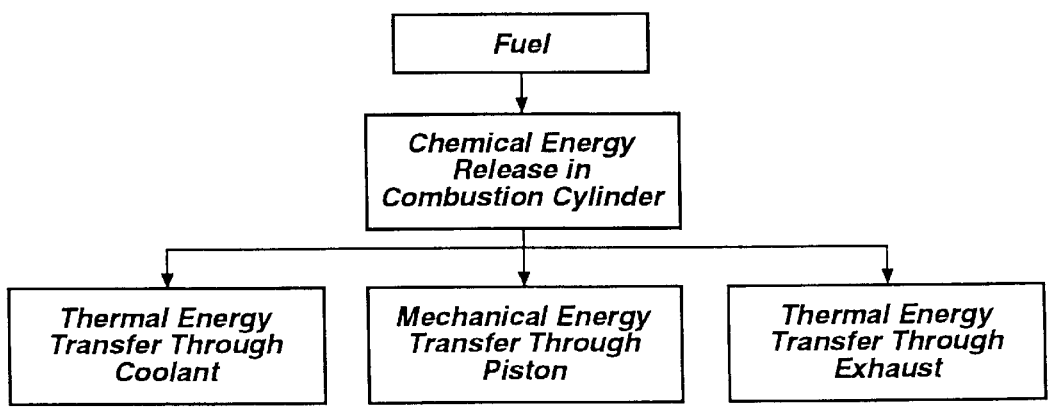
FIG. 12 is a schematic diagram or flowchart showing one possible flow of energy from fuel into the coolant, piston, and exhaust of an internal combustion engine, in accordance with the invention.

As illustrated in the flow diagram of FIG. 12, the initial conversion of chemical energy in an internal combustion engine increases the temperature and pressure of gases inside a cylinder of the engine. Part of the released thermal energy enters the wall of the cylinder and passes into a coolant stream moving past the cylinder in the block. Part of the released mechanical energy is transferred to move a piston in the cylinder. Another part of the released thermal energy (and a portion of the mechanical energy) exits the cylinder with the exhaust gases.

Figure 13:
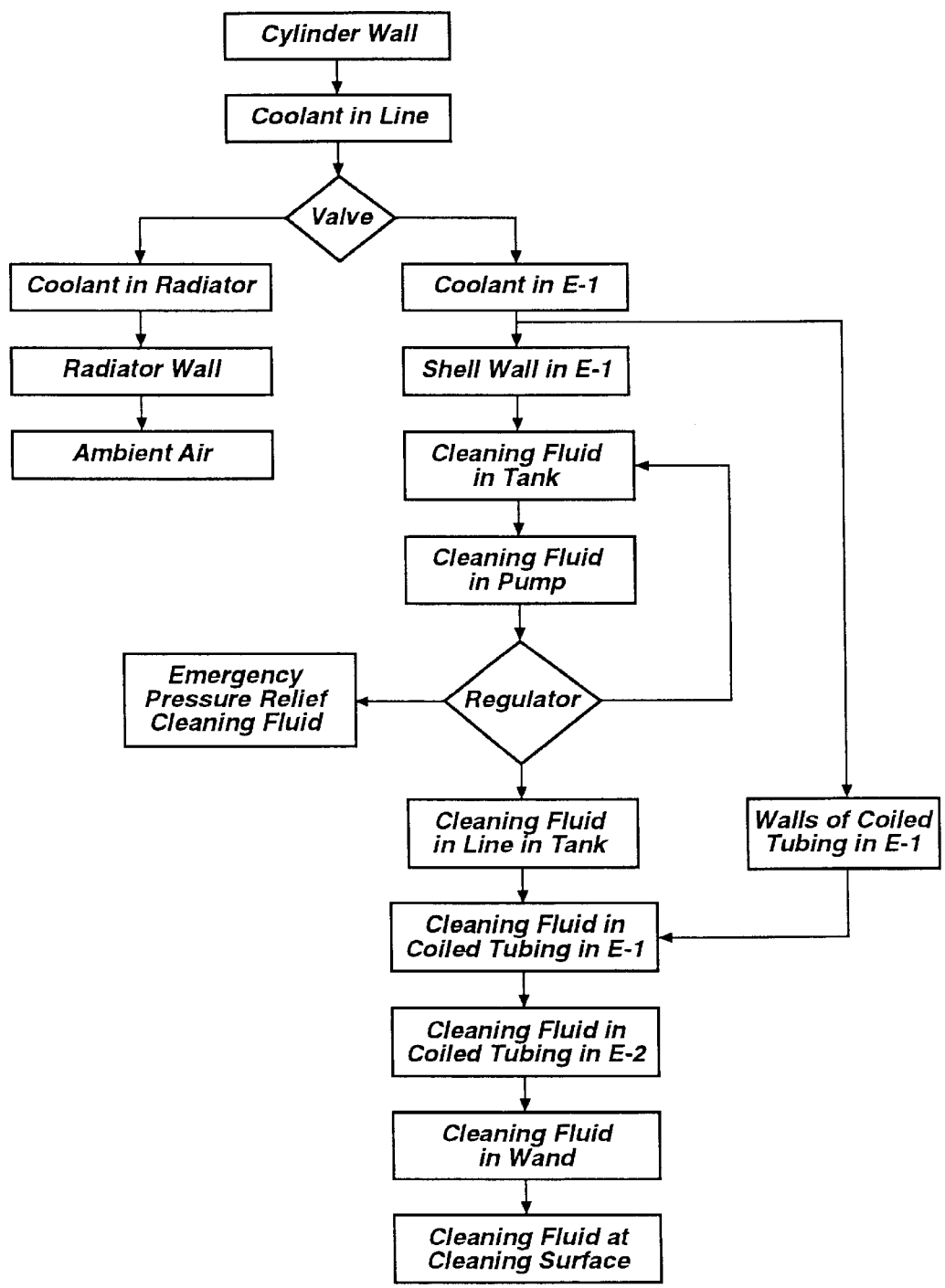
FIG. 13 is a schematic block diagram or flowchart showing one possible flow of thermal energy through the coolant of an internal combustion engine to a cleaning fluid, in accordance with the invention.

FIG. 13 focuses on the thermal energy from the engine 138 that passes into the coolant 165. By convection, thermal energy from a cylinder of the engine 138 enters the coolant 165 in the line 166 leading to the valve 168. If the coolant 165 (or, alternatively, the cleaning fluid 117 in the storage tank 116) is at a temperature above a threshold, preferably approximately 195° F. for the coolant 165, the valve 168 sends the coolant 165 with its associated thermal energy into the radiator 142. The thermal energy then passes through the wall of the radiator 142 and into the ambient air by convection.

If the cleaning fluid 117 is below the threshold temperature, the valve 168 shunts the coolant 165 through the line 170 to convey thermal energy through the first heat exchanger 212. Some of the thermal energy passes through the shell 213 of the first heat exchanger 212 to preheat the cleaning fluid 117 in the tank 116. The remaining thermal energy travels into the walls of the coiled tubing 151 inside the first heat exchanger 212 to be discharged inside the shell 213. Thermal energy in the cleaning fluid 117 in the tank 116 is drawn into the water pump 218 with the cleaning fluid 117 via a line 190.

The thermal energy next passes into the regulator 191 as heat in the cleaning fluid 117. In response to an obstruction, the regulator 91 may optionally expel an amount of cleaning fluid 117 with its associated thermal energy. This does not regularly occur, and represents a malfunction, not a method of managing temperature or energy flows. Otherwise, cleaning fluid 117 needed for immediate use passes, with its associated thermal energy, into a line 210 in the tank 116. The line 210 leads into the first heat exchanger 212, where the cleaning fluid 117 receives more thermal energy from the vehicle engine coolant 165 through the walls of coiled tubing. The cleaning fluid 117 leaving the first heat exchanger 212 conveys thermal energy through the second heat exchanger 152, through the first or second wand 122 or 123, and to the carpet.

Figure 14:
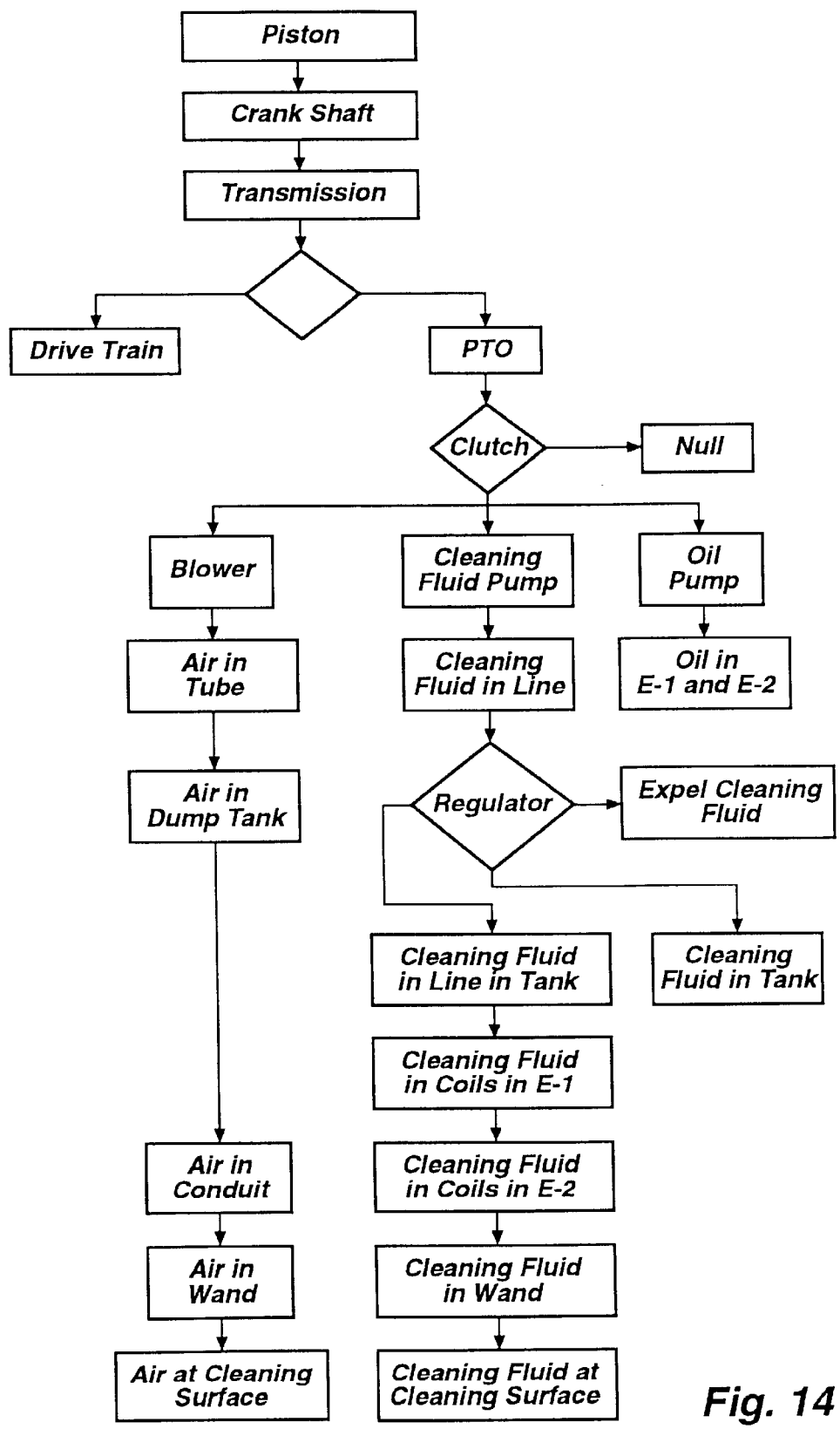
FIG. 14 is a schematic block diagram or flowchart showing one possible flow of mechanical energy through the piston of an internal combustion engine to a cleaning fluid and to an associated airflow, in accordance with the invention.

FIG. 14 is directed to the flow of mechanical energy from a piston of the engine 138. The mechanical energy in the piston is transferred to a crank shaft, where it is converted from a translation to rotational motion. The crank shaft conveys the mechanical energy to the transmission system 140, which further transmits it to a drive train of the truck 112, the PTO 158, or both. If the clutch 160 is not engaged, the mechanical energy from the PTO 158 goes unused. However, if the clutch 160 is engaged, mechanical energy passes to the blower 124, the water pump 118, and the intermediate heat transfer fluid pump 150.

The blower 124 pressurizes air, thereby converting the rotational energy provided by the clutch 158 into potential energy, in the form of a corresponding vacuum (with respect to gage pressure) and compressed air, and kinetic energy, in the form of moving air as a result, a pressure gradient is formed through the dump tank 128, the first or second conduit 130 or 131, and the first or second wand 122 or 123. Thus, the blower 124 uses mechanical energy to extract energy from air, thereby creating an airflow useful to remove soil and fluid.

The water pump 118 transfers mechanical energy in the form of a pressure rise to the cleaning fluid 117. The cleaning fluid 117 exiting the water pump 118 through the line 192 enters the regulator 191. The regulator 191 bleeds off any excess mechanical energy, only in emergency conditions. Typically, the mechanical energy passes with cleaning fluid 117 into the tank 116 and into the line 210 to the first heat exchanger 212. The pressurized cleaning fluid 117 continues on through the first heat exchanger 212, the second heat exchanger 152, and the first 122 or second wands 123 to strike the surface of a carpet at high pressure.

The intermediate heat transfer fluid pump 150 transfers a small amount of mechanical energy to the intermediate heat transfer fluid 151 to induce a pressure rise. The intermediate heat transfer fluid 151 circulates between the first and second heat exchangers 212 and 152. As the intermediate heat transfer fluid 151 leaves the intermediate heat transfer fluid pump 151, pressure drops due to frictional losses (head loss), until it once again reaches the intermediate heat transfer fluid pump 151. Thus, the mechanical energy transferred to the intermediate heat transfer fluid 151 acts simply to maintain the motion thereof.

Figure 15:
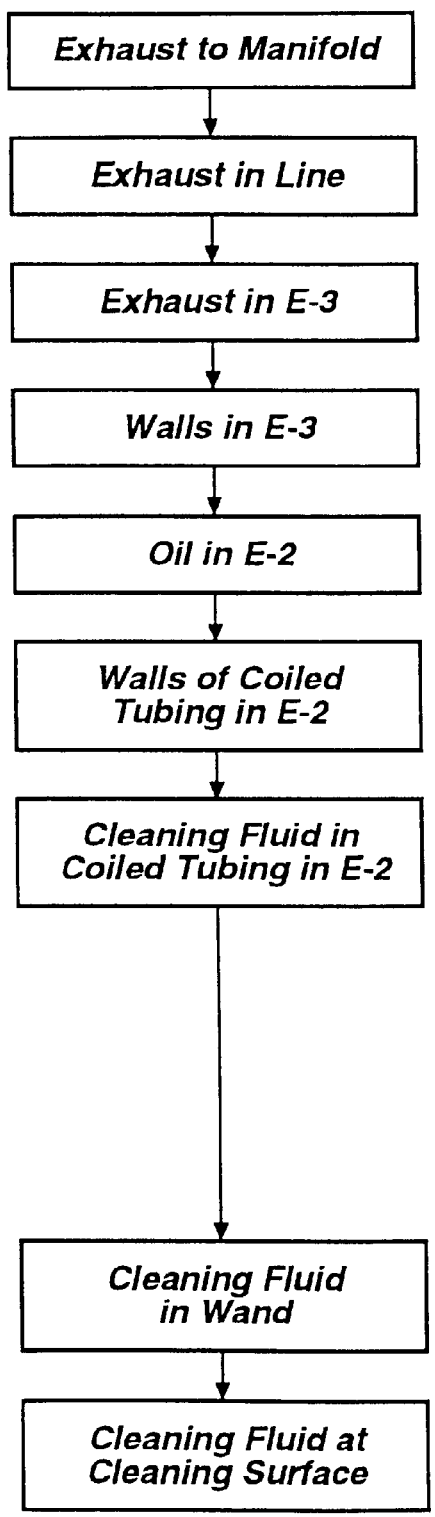
FIG. 15 is a schematic block diagram or flowchart showing one possible flow of thermal energy through the exhaust of an internal combustion engine to a cleaning fluid, in accordance with the invention.

Referring to FIG. 15, thermal energy in the exhaust 147 leaves through a manifold of the engine 138 to reach the line 146. From there, the hot exhaust 147 enters the third heat exchanger 148, where thermal energy is transferred to the tubes 205 and fins 206 (e.g. thread 206) in the third heat exchanger 148 by convection intermediate heat transfer fluid 151 flowing through the third heat exchanger 148 absorbs the thermal energy, once again by convection. The intermediate heat transfer fluid 151 is pumped into the second heat exchanger 152, where thermal energy moves by convection into the walls of the coiled tubing 226. Cleaning fluid 117 moving through the second heat exchanger 152 absorbs the thermal energy by convection and conveys it through the first or second wands 122 or 123 to the carpet surface.

The entire energy delivery and conversion process is improved because every energy transfer step may be properly balanced. If too much energy is transferred in a single step, the equipment could fail or the cleaning fluid 117 could exceed safe temperatures and pressures for carpet cleaning. For example, if the intermediate heat transfer fluid 151 in the second heat exchanger 152 is too hot, thermal breakdown may occur. Also, the cleaning fluid 117 may become too hot for pressure containment or even too hot as it exits the first 122 or second wand 123. Damage to the carpet may result. The cleaning fluid 117 may also corrode the second heat exchanger 152 due to local nucleate boiling. If the coolant 165 in the first heat exchanger 212 is too hot, the cleaning fluid 117 may likewise cause corrosion or each a dangerously high pressure.

If too little energy is transferred in a step, another transfer step may compensate, thereby producing the dangers described previously. Alternatively, the cleaning fluid 117 and air may not reach the flow rates, pressures, and temperatures necessary for effective cleaning.

The energy flows depicted in FIGS. 12–15 are unique. For example, they provide a balance of energy transfers. The engine 138 provides sufficient energy to raise the cleaning fluid 117 and air to the appropriate temperatures, pressures, and flow rates for effective carpet cleaning. This energy is converted to the proper form and applied in stages to the cleaning fluid 117 and air. The invention has the proper mechanisms to ensure that the energy transferred with each step does not exceed the operating limits of the equipment. As a result, the apparatus and method of the invention provides a degree of effectiveness, reliability, durability, and convenience nonexistent in the prior art. Also as a result, fuel efficiencies are much greater, even using a vehicle prime mover, than fuel efficiencies of slide-in units or prior art vehicle driven units. This fuel efficiency comes in addition to the high cleaning efficiency (labor and cleaning fluid use) available as a result of the high temperatures and large balanced heat flows.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. An apparatus for heating and pressurizing a cleaning fluid inside a vehicle, the apparatus comprising:
   an engine affixed to the vehicle as a prime mover thereof and configured to be the sole source of energy to pump and heat the cleaning fluid to a suitable temperature for suspending particulate matter from a carpet;
   a transmission system connected to the engine for transmitting mechanical energy from the engine to the drive train of the vehicle;
   a storage tank that stores the cleaning fluid;
   a liquid pump coupled to the storage tank, a portion of the liquid pump positioned within a flow of the cleaning fluid, for pressurizing the cleaning fluid;
   a power takeoff connected to the transmission system for driving the liquid pump;
   an exhaust line connected to the engine for conducting combustion exhaust from the engine; and
   an exhaust heat exchanger connected to transfer heat from the combustion exhaust to an intermediate fluid, wherein the heat from the intermediate fluid is used to heat the cleaning fluid.

2. The apparatus of claim 1, wherein the exhaust heat exchanger is positioned outside a cargo bay of the vehicle, subjecting the exhaust heat exchanger to a temperature corresponding to an ambient environment.

3. The apparatus of claim 2, further comprising an intermediate fluid line for conveying heat from the exhaust heat exchanger through the intermediate fluid.

4. The apparatus of claim 3, wherein the intermediate fluid resists freezing at seasonal, outdoor, ambient temperatures.

5. The apparatus of claim 3, wherein the intermediate fluid is a petroleum-based liquid.

6. The apparatus of claim 2, further comprising:
   a coolant line connected to the engine for conducting heat from the engine through a coolant flow; and
   a coolant heat exchanger connected to transfer heat from the coolant flow, wherein the coolant heat exchanger transfers heat into a containment vessel containing the cleaning fluid and also into a flow of the cleaning fluid flowing through the coolant heat exchanger.

7. The apparatus of claim 6, wherein the coolant heat exchanger is immersed in the cleaning fluid inside the containment vessel.

8. The apparatus of claim 2, further comprising:
   a coolant line connected to the engine for conducting heat from the engine through a coolant flow;
   a coolant heat exchanger connected to transfer heat from the coolant flow; and
   a coolant diverter for reducing heat transfer from the coolant flow to the coolant heat exchanger.

9. The apparatus of claim 8, further comprising a thermostat for activating the coolant diverter when the temperature of the cleaning fluid exceed a selected level.

10. The apparatus of claim 1, further comprising an intermediate fluid heat exchanger for transferring the heat from the intermediate fluid to the cleaning fluid.

11. An apparatus for heating and pressurizing a cleaning fluid for cleaning purposes, the apparatus comprising:
    an engine to provide energy to pump and heat the cleaning fluid to a suitable temperature for a desired cleaning purpose;
    a storage tank that stores the cleaning fluid;
    a fluid pump, coupled to the engine and storage tank and positioned within a flow of the cleaning fluid, to pressurize the cleaning fluid; and
    a first heat exchanger, placed within the storage tank and coupled to the engine to receive heat from the engine to heat the cleaning fluid within the storage tank prior to being pressurized, comprising:
      an exchange tank;
      a thermal transfer fluid carrier, coupled to the exchange tank and to the engine, to circulate a thermal transfer fluid between the engine and the exchange tank; and
      a cleaning fluid carrier, placed within the exchange tank and coupled to the fluid pump, to transfer heat from the thermal transfer fluid to the cleaning fluid as the cleaning fluid passes through the cleaning fluid carrier.

12. The apparatus of claim 11 further comprising a power takeoff coupled to the engine for driving the fluid pump.

13. The apparatus of claim 12, wherein the power takeoff is continuously coupled to a transmission system to be driven whenever the engine is operating.

14. The apparatus of claim 12, further comprising a clutch, coupled to the engine, to couple the power takeoff to the fluid pump when activated by a user.

15. The apparatus of claim 11, further comprising a cargo bay of a vehicle wherein an exhaust heat exchanger is positioned outside the cargo bay in an ambient temperature environment.

16. The apparatus of claim 11, further comprising an intermediate fluid line for conveying heat from an exhaust heat exchanger to the cleaning fluid through an intermediate fluid.

17. The apparatus of claim 16, wherein the intermediate fluid resists freezing at seasonal, outdoor, ambient temperatures.

18. The apparatus of claim 17, wherein the intermediate fluid is a petroleum-based liquid.

19. The apparatus of claim 16, further comprising an intermediate fluid heat exchanger connected to transfer heat from the intermediate fluid.

20. The apparatus of claim 19 wherein the intermediate fluid heat exchanger raises the temperature of the cleaning fluid to a range of 235 to 265 degrees F.

21. The apparatus of claim 16, further comprising an exhaust diverter for reducing heat transfer from a combustion exhaust to the exhaust heat exchanger.

22. The apparatus of claim 21, further comprising a thermostat for activating the exhaust diverter when the temperature of the intermediate fluid exceeds a selected level.

23. The apparatus of claim 11, further comprising a thermal transfer fluid diverter, coupled to the engine and the first heat exchanger, to divert at least a portion of the thermal transfer fluid from the first heat exchanger to a cooling device.

24. The apparatus of claim 23, further comprising a thermostat to activate the thermal transfer fluid diverter when the temperature of the cleaning fluid exceeds a selected level.

25. The apparatus of claim 11 wherein the first heat exchanger raises the temperature of the cleaning fluid from an initial temperature to a range of 90 to 190 degrees F.

26. The apparatus of claim 11 wherein the cleaning fluid carrier raises the temperature of the cleaning fluid to a range of 190 to 215 degrees F.

27. The apparatus of claim 11 further comprising a take up system, coupled to the engine, comprising:
    a return nozzle, to retrieve the cleaning fluid and residual refuse; and
    a holding tank, coupled to the return nozzle, to collect the cleaning fluid and residual refuse.

28. The apparatus of claim 22 further comprising a vacuum pump, coupled to the holding tank and engine, to generate a vacuum used to remove the cleaning fluid and residual refuse from the cleaning fluid carrier.

29. The apparatus of claim 11 further comprising a cleaning wand, coupled to the fluid pump, to deliver the cleaning fluid.

30. An apparatus for heating and pressurizing a cleaning fluid for cleaning purposes, the apparatus comprising:
    an engine to provide energy to pump and heat the cleaning fluid to a suitable temperature for a desired cleaning purpose, the engine further comprising an exhaust system;
    a transmission system coupled to the engine;
    a storage tank that stores the cleaning fluid;
    a fluid pump, coupled to the storage tank, wherein a portion of said fluid pump is positioned within a flow of the cleaning fluid, to pressurize the cleaning fluid; and
    a primary heat exchanger, coupled to the exhaust system and the fluid pump, to exchange heat from the exhaust of the engine to the cleaning fluid, comprising:
        a cleaning fluid heat exchanger, coupled to the fluid pump;
        an intermediate heat transfer fluid flow path connected to the exhaust system to carry an intermediate heat transfer fluid between the exhaust system and the cleaning fluid heat exchanger.

31. The apparatus of claim 30, further comprising a secondary heat exchanger, placed within the storage tank and coupled to the engine to receive heat from the engine to heat the cleaning fluid within the storage tank prior to being pressurized.

32. The apparatus of claim 31 wherein the secondary heat exchanger comprises:
    an exchange tank;
    a thermal transfer fluid carrier, coupled to the exchange tank and to the engine, to circulate a thermal transfer fluid between the engine and the exchange tank;
    a cleaning fluid carrier, placed within the exchange tank and coupled to the fluid pump, to transfer heat from the thermal transfer fluid to the cleaning fluid as the cleaning fluid passes through the cleaning fluid carrier.

33. The apparatus of claim 31 wherein the secondary heat exchanger raises the temperature of the cleaning fluid from an initial temperature to a range of 90 to 190 degrees F.

34. The apparatus of claim 30 further comprising a power takeoff connected to the transmission system for driving the fluid pump.

35. The apparatus of claim 34, wherein the power takeoff is continuously coupled to the transmission system to be driven whenever the engine is operating.

36. The apparatus of claim 35, further comprising a clutch connected to couple the power takeoff to the fluid pump when activated by a user.

37. The apparatus of claim 30, wherein the exhaust system is positioned outside a cargo bay of a vehicle, subjecting the primary heat exchanger to a temperature corresponding to an ambient temperature.

38. The apparatus of claim 30, wherein the intermediate heat transfer fluid resists freezing at seasonal, outdoor, ambient temperatures.

39. The apparatus of claim 30, wherein the intermediate heat transfer fluid is a petroleum-based liquid.

40. The apparatus of claim 30, further comprising an exhaust diverter, coupled to the exhaust system, to reduce heat transfer from the exhaust to the primary heat exchanger.

41. The apparatus of claim 40, further comprising a thermostat for activating the exhaust diverter when the temperature of the intermediate heat transfer fluid exceeds a selected level.

42. The apparatus of claim 41, further comprising a coolant diverter for reducing heat transfer from a coolant flow to a coolant heat exchanger.

43. The apparatus of claim 40 wherein a cleaning fluid carrier raises the temperature of the cleaning fluid to a range of 190 to 215 degrees F.

44. The apparatus of claim 30, further comprising a thermal transfer fluid diverter, coupled to the engine and the secondary heat exchanger, to divert at least a portion of a thermal transfer fluid from the secondary heat exchanger to a cooling device.

45. The apparatus of claim 44, further comprising a thermostat to activate the thermal transfer fluid diverter when the temperature of the cleaning fluid exceeds a selected level.

46. The apparatus of claim 30 wherein an intermediate fluid heat exchanger raises the temperature of the cleaning fluid to a range of 235 to 265 degrees F.

47. The apparatus of claim 30 further comprising a take up system, coupled to the engine, comprising:
    a return nozzle, to retrieve the cleaning fluid and residual refuse; and
    a return nozzle, to retrieve the cleaning fluid and residual refuse; and
    a holding tank, coupled to the return nozzle, to collect the cleaning fluid and residual refuse.

48. The apparatus of claim 47 further comprising a vacuum pump, coupled to the holding tank and engine, to generate a vacuum used to remove the cleaning fluid and residual refuse.

49. The apparatus of claim 30 further comprising a cleaning wand, coupled to the fluid pump, to deliver the cleaning fluid.

50. A transportable cleaning apparatus for heating and pressurizing a cleaning fluid for cleaning purposes, the apparatus comprising:
    an engine to pump and heat the cleaning fluid to a suitable temperature for a desired cleaning purpose, wherein the engine also provides a motive force for the apparatus;

a transmission system coupled to the engine;

a storage tank that stores the cleaning fluid;

a fluid pump, coupled to the storage tank and partially positioned within a flow of the cleaning fluid, to pressurize the cleaning fluid; and a first heat exchanger, placed within the storage tank and coupled to the engine to receive heat from the engine to heat the cleaning fluid within the storage tank prior to being pressurized, comprising:

an exchange tank;

a thermal transfer fluid carrier, coupled to the exchange tank and to the engine, to circulate a thermal transfer fluid between the engine and the exchange tank;

a cleaning fluid carrier, placed within the exchange tank and coupled to the fluid pump, to transfer heat from the thermal transfer fluid to the cleaning fluid as the cleaning fluid passes through the cleaning fluid carrier.

51. The apparatus of claim 50 further comprising a power takeoff connected to the transmission system for driving the fluid pump.

52. The apparatus of claim 51, wherein the power takeoff is continuously coupled to the transmission system to be driven whenever the engine is operating.

53. The apparatus of claim 51, further comprising a clutch connected to couple the power takeoff to the fluid pump when activated by a user.

54. The apparatus of claim 51 further comprising a take up system, coupled to the engine, comprising:

a return nozzle, to retrieve the cleaning fluid and residual refuse; and a holding tank, coupled to the return nozzle, to collect the cleaning fluid and residual refuse.

55. The apparatus of claim 54 further comprising a vacuum pump, coupled to the holding tank and engine, to generate a vacuum used to remove the cleaning fluid and residual refuse from the cleaning fluid carrier.

56. The apparatus of claim 50, further comprising an exhaust line connected to the engine for conducting combustion exhaust from the engine.

57. The apparatus of claim 56, further comprising an exhaust heat exchanger connected for transferring heat from the combustion exhaust to the intermediate fluid.

58. The apparatus of claimed 57, further comprising a cargo bay of a vehicle wherein the exhaust heat exchanger is positioned outside the cargo bay, subjecting the exhaust heat exchanger to a temperature corresponding to an ambient environment.

59. The apparatus of claim 57, further comprising an intermediate fluid line for conveying heat from the exhaust heat exchanger to the cleaning fluid through an intermediate fluid.

60. The apparatus of claim 59, wherein the intermediate fluid resists freezing at seasonal, outdoor ambient temperatures.

61. The apparatus of claim 59, wherein the intermediate fluid is a petroleum-based liquid.

62. The apparatus of claim 59, further comprising an intermediate fluid heat exchanger connected for transferring the heat from the intermediate fluid.

63. The apparatus of claim 62 wherein the intermediate fluid heat exchanger raises the temperature of the cleaning fluid to a range of 235 to 265 degrees F.

64. The apparatus of claim 57, further comprising an exhaust diverter for reducing heat transfer from the combustion exhaust to the exhaust heat exchanger.

65. The apparatus of claim 64, further comprising a thermostat for activating the exhaust diverter when the temperature of an intermediate fluid exceeds a selected level.

66. The apparatus of claim 50, further comprising the thermal transfer fluid diverts, coupled to the engine and the first heat exchanger, to divert at least a portion of a thermal transfer fluid from the first heat exchanger to a cooling device.

67. The apparatus of claim 66, comprising a thermostat to activate the thermal transfer fluid diverter when the temperature of the cleaning fluid exceeds a selected level.

68. The apparatus of claim 50 wherein the first heat exchanger raises the temperature of the cleaning fluid from an initial temperature to a range of 90 to 190 degrees F.

69. The apparatus of claim 50 wherein the cleaning fluid carrier raises the temperature of the cleaning fluid to a range of 190 to 215 degrees F.

70. The apparatus of claim 50 further comprising a cleaning wand, coupled to the fluid pump, to deliver the cleaning fluid.

71. A system that includes a vehicle having an apparatus for heating and pressurizing a clean fluid for cleaning purposes, the system comprising:

an engine utilized to power the vehicle and to provide energy to pump and heat the cleaning fluid to a suitable temperature for a desired cleaning purpose, the engine further comprising an exhaust system;

a transmission system coupled to the engine;

a storage tank that stores the cleaning fluid;

a fluid pump, coupled to the transmission system and storage tank and positioned within a flow of the cleaning fluid, to pressurize the cleaning fluid; and a primary heat exchanger, coupled to the exhaust system and the fluid pump, to exchange heat from exhaust of the engine to the cleaning fluid, comprising:

a cleaning fluid heat exchanger, coupled to the fluid pump;

an intermediate heat transfer fluid flow path connected to the exhaust system to carry an intermediate heat transfer fluid between the exhaust system and the cleaning fluid heat exchanger.

72. The system according to claim 71, further comprising a secondary heat exchanger, placed within the storage tank and coupled to the engine to receive heat from the engine to heat the cleaning fluid within the storage tank prior to being pressurized.

73. The system according to claim 72 wherein the secondary heat exchanger comprises:

an exchange tank;

a thermal transfer fluid carrier, coupled to the exchange tank and to the engine, to circulate a thermal transfer fluid between the engine and the exchange tank;

a cleaning fluid carrier, placed with n the exchange tank and coupled to the fluid pump, to transfer heat from the thermal transfer fluid to the cleaning fluid as the cleaning fluid passes through the cleaning fluid carrier.

74. The system according to claim 73, further comprising a radiator, coupled to the engine, to reduce heat transfer from the thermal transfer fluid to the secondary heat exchanger.

75. The system according to claim 72, further comprising a thermal transfer fluid diverter, coupled to the engine and the secondary heat exchanger, to divert at least a portion of the thermal transfer fluid from a first heat exchanger to a cooling device.

76. The system according to claim 75, further comprising a thermostat to activate the thermal transfer fluid diverter when the temperature of the cleaning fluid exceeds a selected level.

77. The system according to claim 72 wherein the secondary heat exchanger raises the temperature of the cleaning fluid from an initial temperature to a range between 90 to 190 degrees F.

78. The system according to claim 71 further comprising a power takeoff connected to the transmission system for driving the fluid pump.

79. The system according to claim 78, wherein the power takeoff is continuously coupled to the transmission system to be driven whenever the engine is operating.

80. The system according to claim 79, further comprising a clutch connected to couple the power takeoff to the fluid pump when activated by a user.

81. The system according to claim 71, wherein the exhaust system is positioned outside a cargo bay of a vehicle, subjecting an exhaust heat exchanger to a temperature corresponding to an ambient environment.

82. The system according to claim 71, wherein the intermediate heat transfer fluid resists freezing at seasonal, outdoor, ambient temperatures.

83. The system according to claim 82, wherein the intermediate heat transfer fluid is a petroleum-based liquid.

84. The system according to claim 71, further comprising an exhaust diverter, coupled to the exhaust system, to reduce heat transfer from the exhaust to the primary heat exchanger.

85. The system according to claim 84, further comprising a thermostat for activating the exhaust diverter when the temperature of the intermediate heat transfer fluid exceeds a selected level.

86. The system according to claim 85 wherein a cleaning fluid carrier raises the temperature of the cleaning fluid to a range between 190 to 215 degrees F.

87. The system according to claim 71 wherein an intermediate fluid heat exchanger raises the temperature of the cleaning fluid to arrange between 235 to 265 degrees F.

88. The system according to claim 71 further comprising a take up system, coupled to the engine, comprising:
  a return nozzle, to retrieve the cleaning fluid and residual refuse; and
  a holding tank, coupled to the return nozzle, to collect the cleaning fluid and residual refuse.

89. The system according to claim 88 further comprising a vacuum pump, coupled to the holding tank and engine, to generate a vacuum used to remove the cleaning fluid and residual refuse.

90. The system of claim 71 further comprising a cleaning wand, coupled to the fluid pump, to deliver the cleaning fluid.

91. A transportable apparatus comprising:
  an engine utilized for motive power off the apparatus and to pump and heat a cleaning fluid to a suitable temperature to clean an object;
  an exhaust system coupled to the engine;
  a transmission system coupled to the engine;
  a storage tank that stores the cleaning fluid;
  a fluid pump, coupled to the storage tank, to pressurize the cleaning fluid in the storage tank;
  a primary heat exchanger, coupled to the exhaust system and the fluid pump, to exchange heat between exhaust of the engine and the cleaning fluid prior to and substantially simultaneously with initiating delivery of the cleaning fluid to the object to be cleaned; and
  a secondary heat exchanger, placed within the storage tank and coupled to the engine, the secondary heat exchanger having a first heating stage and a second heating stage, wherein the cleaning fluid within the storage tank is a first temperature during the first heating stage and then heated to a second temperature, higher than the first temperature, during the second heating stage within the secondary heat exchanger and prior to passing to the primary heat exchanger, wherein the secondary heat exchanger comprises:
  an exchange tank;
  a thermal transfer fluid carrier, coupled to the exchange tank and to the engine, to circulate a thermal transfer fluid between the engine and the exchange tank; and
  a cleaning fluid carrier, placed within the exchange tank and coupled to the fluid pump, to transfer heat from the thermal transfer fluid to the cleaning fluid as the cleaning fluid passes through the cleaning fluid carrier.

92. The apparatus according to claim 91 wherein the primary heat exchanger comprises:
  a cleaning fluid heat exchanger, coupled to the storage tank; and
  an intermediate heat transfer fluid flow path, coupled to the cleaning fluid heat exchanger and the exhaust system, to carry an intermediate heat transfer fluid between the exhaust system and the cleaning fluid heat exchanger.

93. The apparatus according to claim 92 wherein the cleaning fluid heat exchanger includes an interior chamber comprising a plurality of carrier tubes such that the intermediate heat transfer fluid flows within the interior chamber and the cleaning fluid passes through the plurality of carrier tubes.

94. The apparatus according to claim 93 wherein at least one of the plurality of carrier tubes has threads along a portion of the tube to increase its surface area.

95. The apparatus according to claim 94 wherein the plurality of carrier tubes are made of stainless steel.

96. The apparatus according to claim 92 wherein the intermediate heat transfer fluid flow path comprises a sealed baffle chamber having an interior chamber with a plurality of exhaust tubes within the interior chamber such that the intermediate heat transfer fluid flows within the interior chamber in communication with an exterior portion of each of the plurality of exhaust tubes and the exhaust passes through the plurality of exhaust tubes.

97. The apparatus according to claim 96 wherein at least one of the plurality of exhaust tubes has threads along a portion of the tube to increase its surface area.

98. The apparatus according to claim 97 wherein the plurality of exhaust tubes are made of stainless steel.

99. The apparatus according to claim 92 wherein the primary heat exchanger further comprises an intermediate heat transfer fluid expansion chamber connected to the cleaning fluid heat exchanger.

100. The apparatus according to claim 92, wherein the intermediate heat transfer fluid resists freezing at seasonal, outdoor, ambient temperatures.

101. The apparatus according to claim 92, wherein the intermediate heat transfer fluid is a petroleum-based liquid.

102. The apparatus according to claim 91 further comprising an exhaust diverter, coupled to the exhaust system, to reduce heat transferred from combustion exhaust of the engine to the primary heat exchanger.

103. The apparatus according to claim 102 further comprising a thermostat, coupled to the exhaust diverter, to activate the exhaust diverter upon the cleaning fluid reaching a selected temperature.

104. The apparatus according to claim 91 wherein the cleaning fluid carrier includes at least one coiled tube.

105. The apparatus according to claim 91, further comprising a thermal transfer fluid diverter, coupled to the engine and the secondary heat exchanger, to divert at least a portion of the thermal transfer fluid from the secondary heat exchanger, to a cooling device coupled to the engine.

106. The apparatus according to claim 105, further comprising a thermostat to activate the thermal transfer fluid diverter when the temperature of the cleaning fluid exceeds a selected level.

107. The apparatus according to claim 91, further comprising a power takeoff connected to the transmission system for driving the fluid pump.

108. The apparatus according to claim 107, wherein the power takeoff is continuously coupled to the transmission system to be driven whenever the engine is operating.

109. The apparatus according to claim 107, further comprising a clutch connected to couple the power takeoff to the fluid pump when activated by a user.

110. The apparatus according to claim 91, wherein the exhaust system is positioned outside a cargo bay of a vehicle, subjecting an exhaust heat exchanger to a temperature corresponding to an ambient environment.

111. The according to claim 91 wherein the first heating stage of the secondary heat exchanger raises the temperature of the cleaning fluid from an initial temperature to a range of 90 to 190 degrees F.

112. The apparatus according to claim 91 wherein the second heating stage of the secondary heat exchanger raises the temperature of the cleaning fluid to a range of 190 to 215 degrees F.

113. The apparatus according to claim 112 wherein the second heating stage of the secondary heat exchanger raises the temperature of the cleaning fluid to a range of 200 to 205 degrees F.

114. The apparatus according to claim 91 wherein an intermediate fluid heat exchanger raises the temperature of the cleaning fluid to a range between 235 to 265 degrees F.

115. The apparatus according to claim 91 further comprising a take up system, coupled to the engine, comprising:
   a return nozzle, to retrieve the cleaning fluid and residual refuse; and
   a holding tank, coupled to the return nozzle, to collect the cleaning fluid and residual refuse.

116. The apparatus according to claim 115 further comprising a vacuum pump, coupled to the holding tank and engine, to generate a vacuum used to remove the cleaning fluid and residual refuse from the cleaning fluid carrier.

117. The apparatus of claim 91 further comprising a cleaning wand, coupled to the fluid pump, to deliver the cleaning fluid to the object to be cleaned.

* * * * *